US012659520B2

(12) United States Patent
Cutler et al.

(10) Patent No.: US 12,659,520 B2
(45) Date of Patent: Jun. 16, 2026

(54) MACHINE LEARNING MODELS FOR ADAPTIVE POST-PROCESSING USING RESULTS OF SCENARIO DETECTION IN CONFERENCING TOOLS

(71) Applicant: Microsoft Technology Licensing, LLC, Redmond, WA (US)

(72) Inventors: Ross Garrett Cutler, Clyde Hill, WA (US); Nabakumar Singh Khongbantabam, Bellevue, WA (US); Henrik Valdemar Turbell, Redmond, WA (US); Babak Naderi, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/755,255

(22) Filed: Jun. 26, 2024

(65) Prior Publication Data

US 2026/0006259 A1     Jan. 1, 2026

(51) Int. Cl.
H04N 19/86 (2014.01)
H04N 19/119 (2014.01)
(Continued)

(52) U.S. Cl.
CPC ........... H04N 19/86 (2014.11); H04N 19/119 (2014.11); H04N 19/132 (2014.11);
(Continued)

(58) Field of Classification Search
CPC .... H04N 19/86; H04N 19/119; H04N 19/132; H04N 19/154; H04N 19/156;
(Continued)

(56) References Cited

U.S. PATENT DOCUMENTS

2008/0152245 A1     6/2008   El-Maleh et al.
2009/0161768 A1     6/2009   Park et al.
(Continued)

FOREIGN PATENT DOCUMENTS

CN       113242428       8/2021
CN       113301355       8/2021
(Continued)

OTHER PUBLICATIONS

Chan et al., "BasicVSR++: Improving Video Super-Resolution with Enhanced Propagation and Alignment," arXiv:2104.13371v1, 12 pp. (Apr. 27, 2021).
(Continued)

*Primary Examiner* — Tracy Y. Li
(74) *Attorney, Agent, or Firm* — Klarquist Sparkman, LLP

(57)          ABSTRACT

Innovations in machine learning ("ML") models used in adaptive post-processing of decoded video in a conferencing tool are described. For example, as part of post-processing of decoded video, a super-resolution/video restoration model increases spatial resolution (e.g., by interpolation between sample values), mitigates compression artifacts, and mitigates upscaling artifacts introduced when increasing spatial resolution. Or, as another example, as part of post-processing of decoded video, a video restoration model mitigates compression artifacts, without increasing spatial resolution. For adaptive post-processing, a post-processing model can be selectively applied depending on results of scenario detection, results of segmentation, and/or results of video quality analysis. With the innovations, a conferencing tool can in effect provide video at higher quality without significantly increasing the network bandwidth consumed by the video or, alternatively, provide video using less
(Continued)

training a scenario-specific
post-processing model network bandwidth without significantly hurting the quality of the video.

20 Claims, 12 Drawing Sheets

(51) Int. Cl.

| | |
|---|---|
| *H04N 19/132* | (2014.01) |
| *H04N 19/154* | (2014.01) |
| *H04N 19/156* | (2014.01) |
| *H04N 19/172* | (2014.01) |
| *H04N 19/174* | (2014.01) |
| *H04N 19/20* | (2014.01) |
| *H04N 19/42* | (2014.01) |

(52) U.S. Cl.
CPC ......... *H04N 19/154* (2014.11); *H04N 19/156* (2014.11); *H04N 19/20* (2014.11); *H04N 19/42* (2014.11); *H04N 19/172* (2014.11); *H04N 19/174* (2014.11)

(58) Field of Classification Search
CPC ...... H04N 19/20; H04N 19/42; H04N 19/172; H04N 19/174
See application file for complete search history.

(56) References Cited

U.S. PATENT DOCUMENTS

| | | | |
|---|---|---|---|
| 2020/0327702 A1 | 10/2020 | Wang et al. | |
| 2021/0352347 A1 | 11/2021 | Arora | |
| 2022/0044366 A1* | 2/2022 | Zhang | G06N 3/08 |
| 2023/0102895 A1 | 3/2023 | Kim et al. | |
| 2024/0144480 A1* | 5/2024 | Seeber | G06V 10/82 |
| 2024/0193726 A1* | 6/2024 | Misra | G06V 10/774 |
| 2024/0249478 A1* | 7/2024 | Sztuk | G06T 19/006 |
| 2024/0320952 A1* | 9/2024 | Petitpont | G06V 10/82 |
| 2025/0126290 A1* | 4/2025 | Patel | G06T 5/20 |
| 2026/0006155 A1 | 1/2026 | Cutler et al. | |
| 2026/0006156 A1 | 1/2026 | Cutler et al. | |

FOREIGN PATENT DOCUMENTS

| | | |
|---|---|---|
| CN | 115601234 | 1/2023 |
| CN | 117528147 | 2/2024 |
| EP | 3926947 | 12/2021 |

OTHER PUBLICATIONS

Liang et al., "Details or Artifacts: A Locally Discriminative Learning Approach to Realistic Image Super-Resolution," *IEEE Image and Video Processing*, pp. 1-10 (Mar. 2022).

Ronneberger et al., "U-Net: Convolutional Networks for Biomedical Image Segmentation," arXiv:1505.04593v1, 8 pp. (May 18, 2015).

Zhang et al., "Residual Dense Network for Image Super-Resolution," *Computer Vision and Pattern Recognition*, pp. 2472-2481 (Mar. 2018).

International Search Report and Written Opinion dated Jul. 16, 2025, from International Patent Application No. PCT/US2025/022832, 16 pp.

Mittag et al., "LSTM-Based Video Quality Prediction Accounting for Temporal Distortions in Videoconferencing Calls," arXiv:2303.12761v1, 5 pp. (Mar. 2023).

Thomas et al., "A Reduced-Precision Network for Image Reconstruction," ACM Trans. Graph., vol. 39, No. 6, Article 231, 12 pp. (Dec. 2020).

Viola et al., "Rapid Object Detection Using a Boosted Cascade of Simple Features," IEEE Conf. on Computer Vision and Pattern Recognition, pp. I-511-I-518 (Dec. 2001).

Wang et al., "ESRGAN: Enhanced Super-Resolution Generative Adversarial Networks," arXiv:1809.00219v2, 23 pp. (Sep. 2018).

International Search Report and Written Opinion dated Jul. 24, 2025, from International Patent Application No. PCT/US2025/022648, 16 pp.

International Search Report and Written Opinion dated Aug. 4, 2025, from International Patent Application No. PCT/US2025/022833, 11 pp.

Li et al., "QEVC: Quality Enhancement-Oriented Video Coding," 5th Int'l Conf. on Computer and Communication Systems, pp. 296-300 (May 2020).

Wikipedia, "Long short-term memory," downloaded from https://en.wikipedia.org/w/index.php?title=Long_short-term_memory&oldid=1227760343, 15 pp. (Jun. 7, 2024).

Office Action dated Mar. 18, 2026, from U.S. Appl. No. 18/755,269, 16 pp.

\* cited by examiner

FIG. 1                                      training a scenario-specific
                                            post-processing model
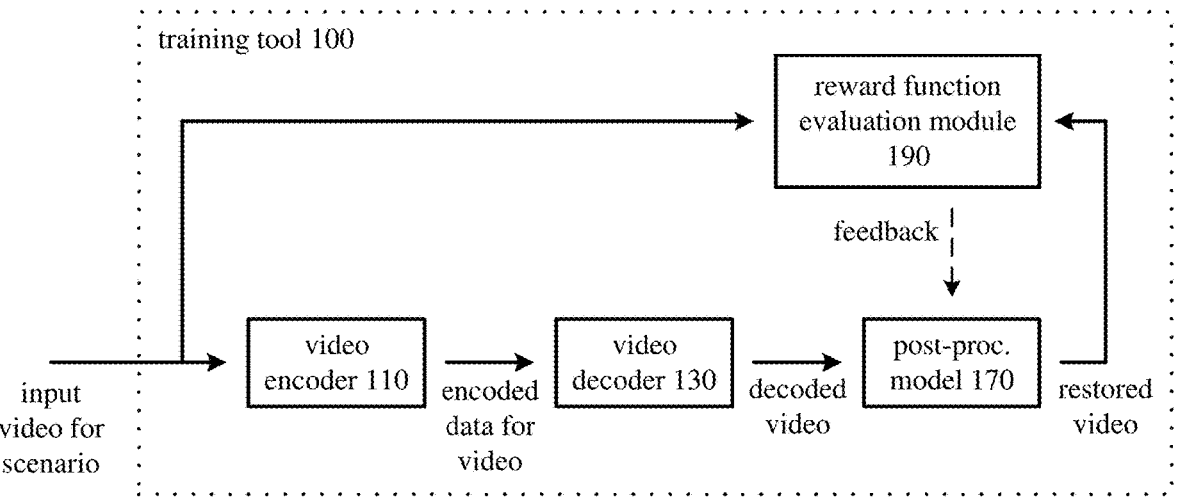

playback-side inference using
trained post-processing model playback-side inference using
trained post-processing model playback-side inference using
trained post-processing model FIG. 2d          playback-side inference using
trained post-processing model
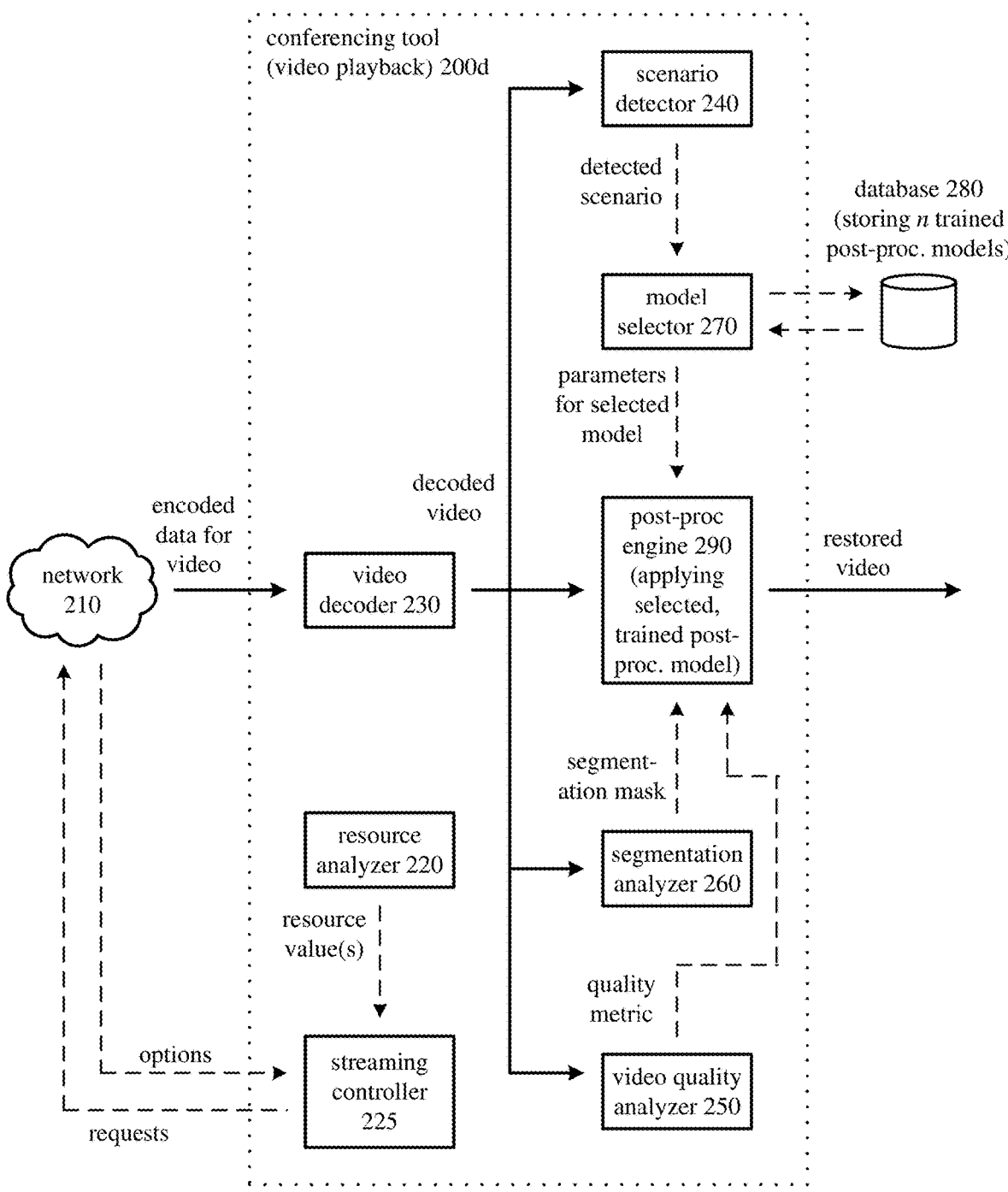

playback-side inference using
trained post-processing model

FIG. 3a    <u>300</u>
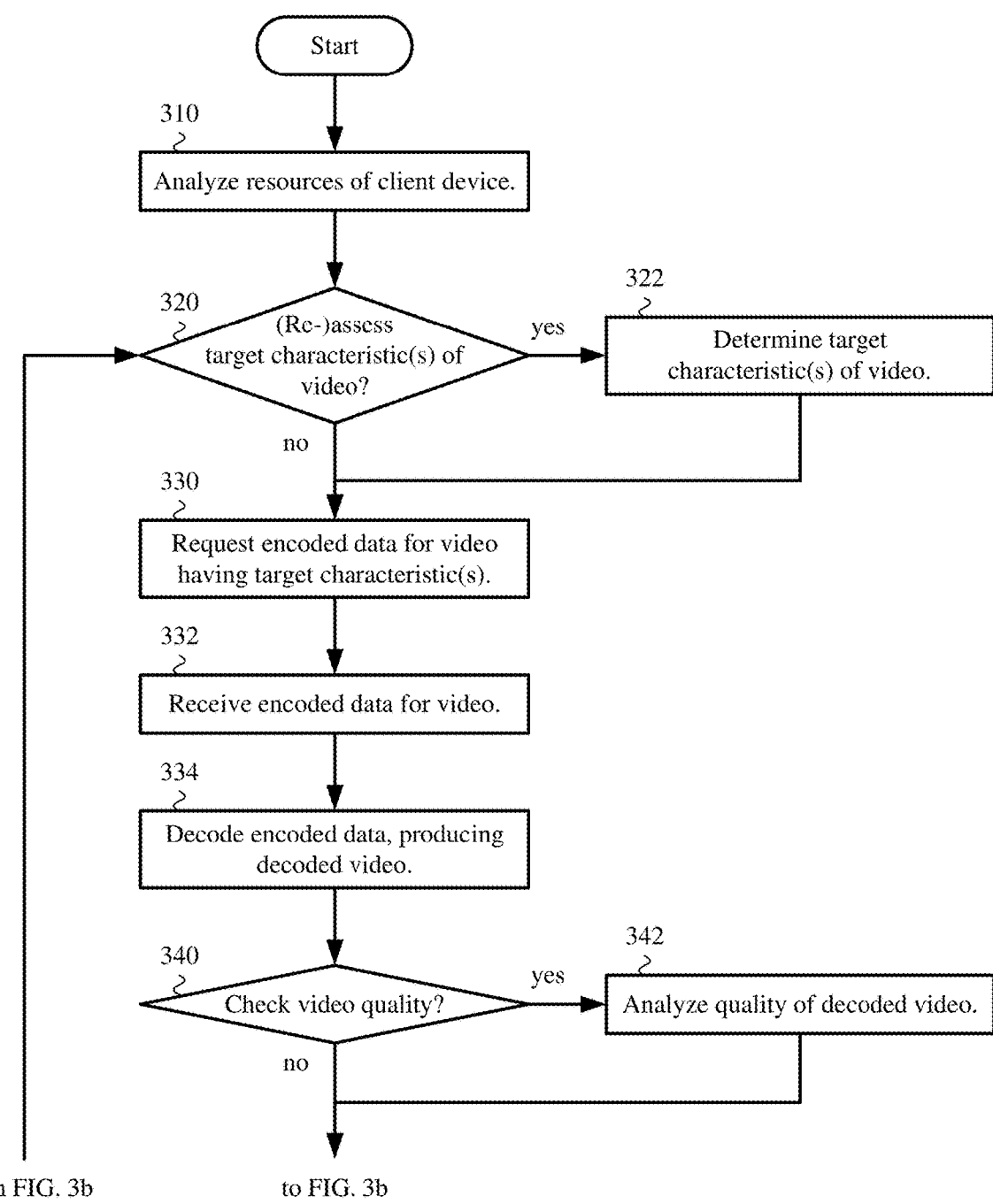

FIG. 3b     <u>300</u> (cont.)
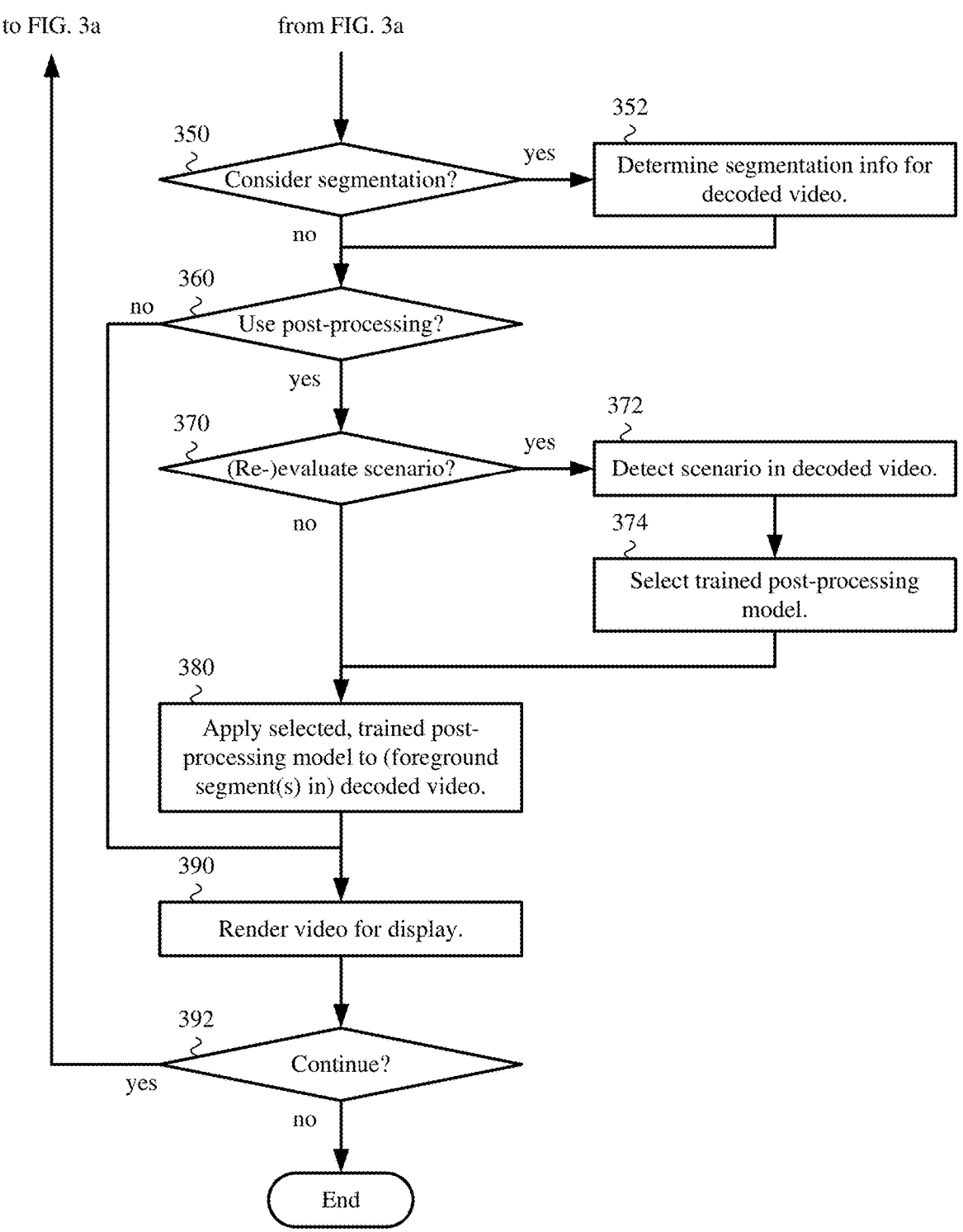

FIG. 4    400
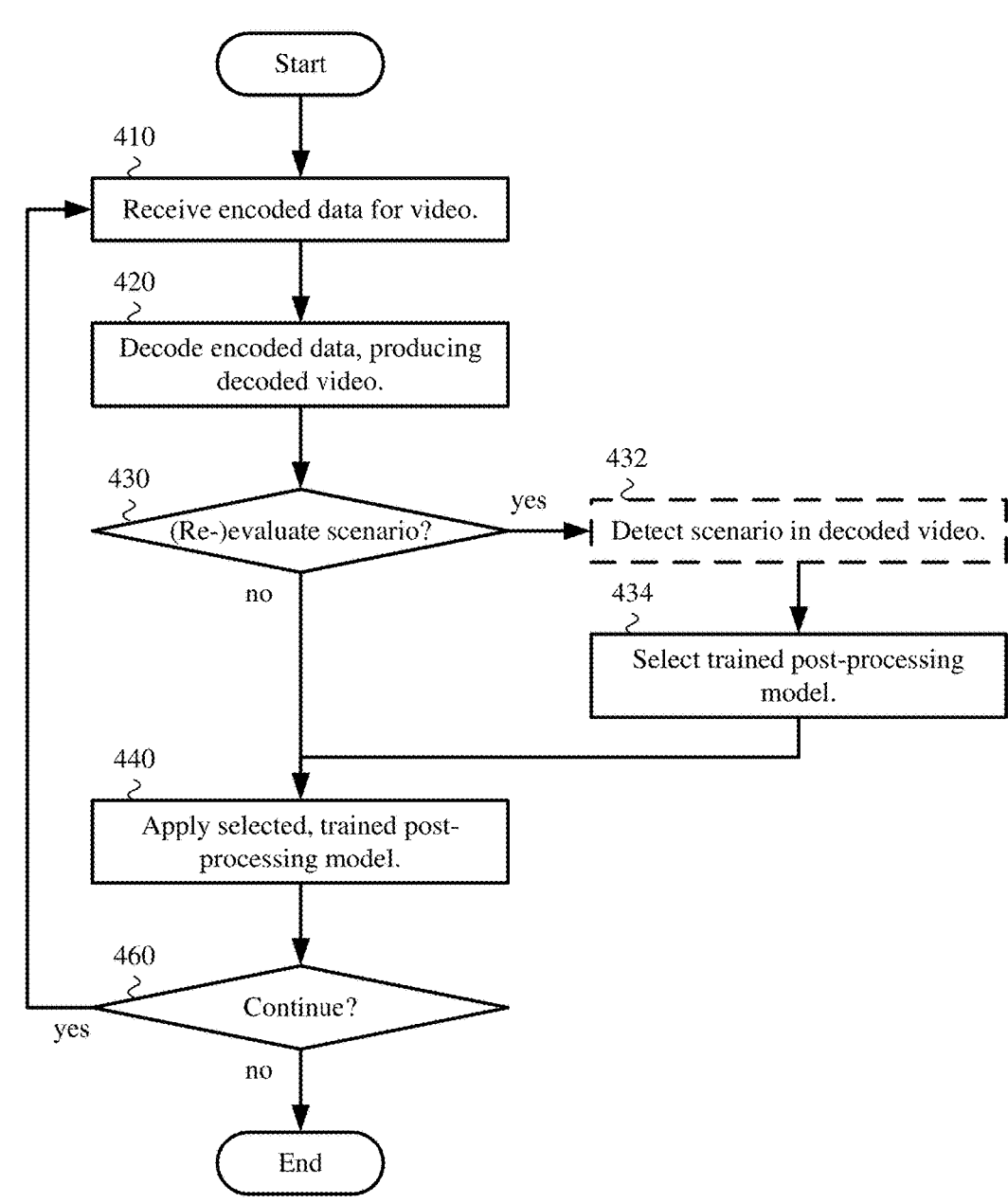

FIG. 5          500
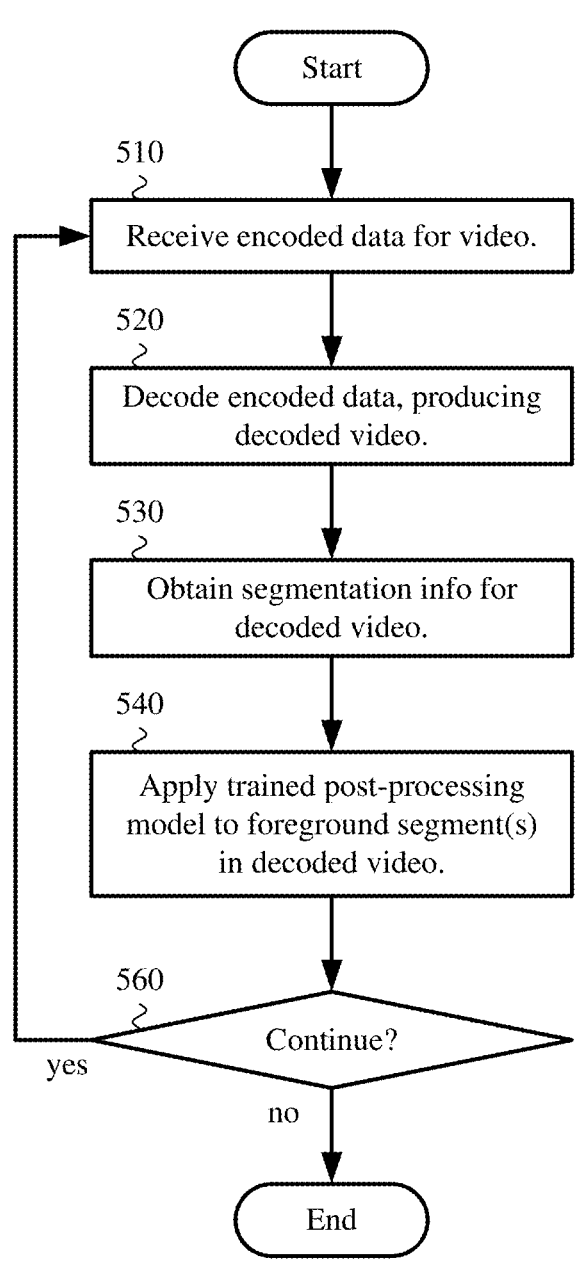

FIG. 6     600
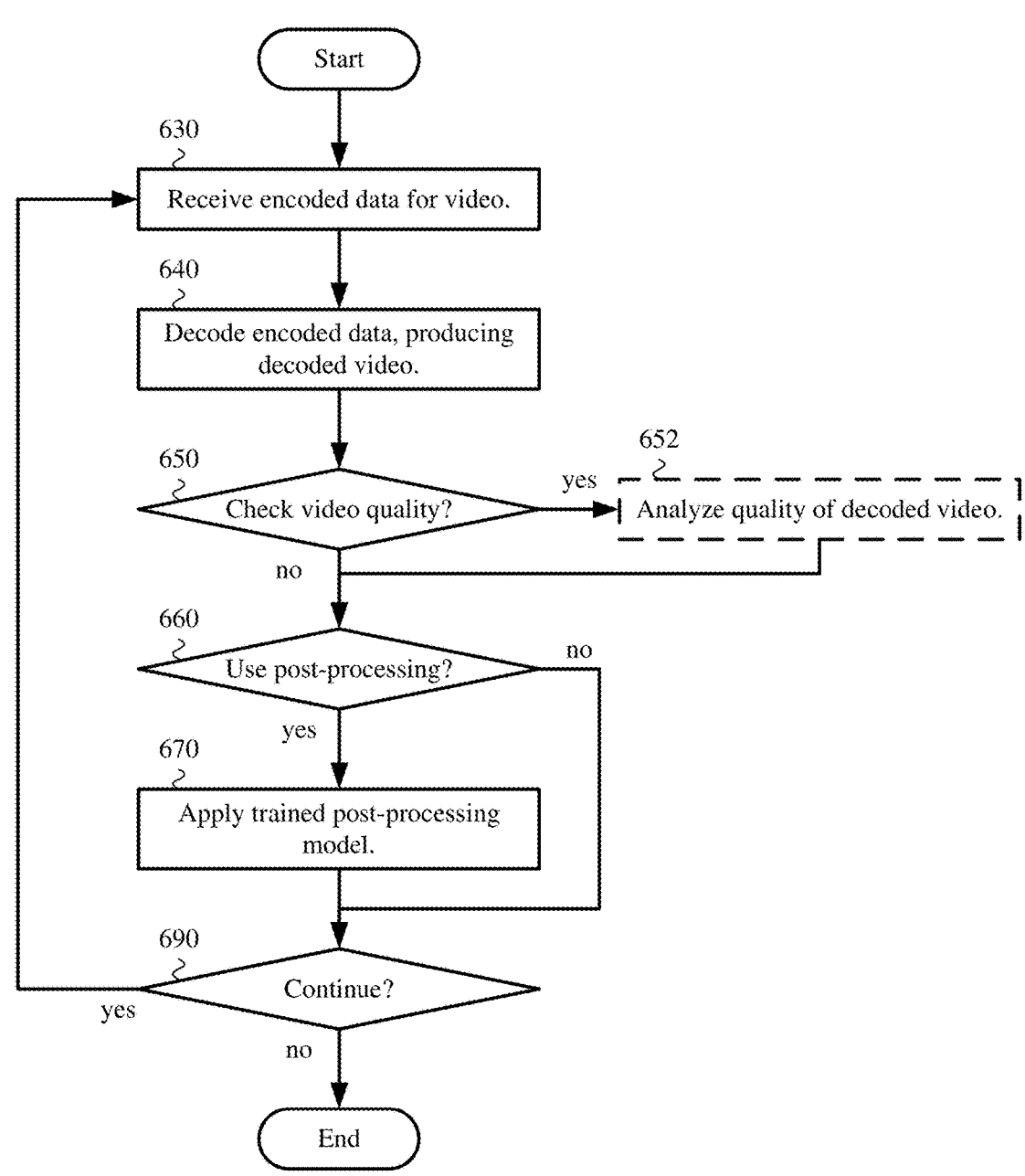

software 780 implementing one or more innovations
for ML models for adaptive post-processing in video
conferencing tools

MACHINE LEARNING MODELS FOR ADAPTIVE POST-PROCESSING USING RESULTS OF SCENARIO DETECTION IN CONFERENCING TOOLS

BACKGROUND

Video encoder-decoder ("codec") systems have become highly optimized over the past 35 years. Typically, a video codec implements complicated algorithms for compression and decompression, using a wide range of tools. Examples of video codecs include those that implement the H.264/AVC standard, H.265/HEVC standard, H.266/VVC standard, VP9 standard, or AV1 standard, as well as those that implement proprietary formats. A video encoder for a codec standard or proprietary format can provide very good quality for a given bitrate of encoded data. Even so, some information is typically lost during the compression process.

Lossy compression can introduce various types of distortions (also called compression artifacts) that are noticeable in video after decoding. For example, reconstructed video can exhibit blocking artifacts at boundaries between blocks of sample values used in encoding and decoding, ringing artifacts in which edges of content are repeated in the reconstructed video, blurring artifacts in which details are lost due to quantization, banding artifacts (also called posterization) in which fine-grained differences in colors are lost, and mosquito noise artifacts.

Video encoding and decoding can be used in various contexts, including online streaming and conferencing. A conferencing tool can process streams of audio content, streams of video content, series of text messages, and other types of content. Of the different types of content, video content typically consumes the most bandwidth. In some cases, the quality of video content suffers during conferencing due to network congestion, which can cause issues such as delays in delivery or drops of packets of encoded data. In other cases, due to limitations on available network bandwidth, video content is preemptively encoded at low quality during conferencing. Compared to packets of encoded data for high-quality video, packets of encoded data for the low-quality video consume less bandwidth and are more likely to be delivered in a timely manner. On the other hand, low-quality video can exhibit extensive compression artifacts due to aggressive lossy compression.

SUMMARY

In summary, the detailed description presents innovations in machine learning ("ML") models used in adaptive post-processing of decoded video in a conferencing tool. With the innovations, a conferencing tool can in effect provide video at higher quality without significantly increasing the network bandwidth consumed by the video or, alternatively, provide video using less network bandwidth without significantly hurting the quality of the video. The innovations include adaptive post-processing that depends on results of scenario detection, adaptive post-processing that depends on results of segmentation, and adaptive post-processing that depends on results of video quality analysis. The innovations can be used in combination or separately.

According to a first set of techniques and tools described herein, a client computing device that implements a conferencing tool performs adaptive post-processing of decoded video that depends on results of scenario detection. The conferencing tool receives encoded data in a bitstream for a current unit (e.g., frame) of a video sequence. The conferencing tool decodes the encoded data, producing decoded video for the current unit of the video sequence. Based on results of detecting a scenario with a scenario detection model, the conferencing tool selects between multiple trained post-processing models. For example, each of the multiple trained post-processing models has been trained to perform post-processing operations for a different scenario selected from among multiple scenarios (such as talking head video, conference room video, and slideshow presentation video). For example, with the scenario detection model, the conferencing tool detects a scenario in the decoded video for the current unit of the video sequence, thereby producing the results of the detecting the scenario with the scenario detection model. Alternatively, the conferencing tool receives, from a server computing device, the results of the detecting the scenario with the scenario detection model. The scenario detection model can use a face detection model and a count of faces in the decoded video. Or, more generally, the scenario detection model can be an ML model configured to accept, as input, sample values of the decoded video for the current unit of the video sequence and configured to produce, as output, an indication of the detected scenario. The conferencing tool applies the selected, trained post-processing model to at least some decoded video for the video sequence (e.g., the decoded video for the for the current unit of the video sequence and/or decoded video for one or more subsequent units of the video sequence). In some implementations, a post-processing model is a super-resolution ("SR")/video restoration ("VR") model configured to increase spatial resolution (e.g., by interpolation between sample values), mitigate compression artifacts, and mitigate upscaling artifacts introduced when increasing spatial resolution. Alternatively, a post-processing model can be a VR model configured to mitigate compression artifacts, without increasing spatial resolution. By applying a post-processing model trained for a specific scenario, the conferencing tool can enhance the quality of decoded video by addressing artifacts introduced during compression and/or upscaling of video for that type of scenario.

According to a second set of techniques and tools described herein, a client computing device that implements a conferencing tool performs adaptive post-processing of decoded video that depends on results of segmentation. The conferencing tool receives encoded data in a bitstream for a current unit (e.g., frame) of a video sequence. The conferencing tool decodes the encoded data, producing decoded video for the current unit of the video sequence. The conferencing tool obtains segmentation information for the decoded video for the current unit of the video sequence. For example, the conferencing tool uses an ML model having a convolutional U-net architecture to determine the segmentation information. Alternatively, the conferencing tool receives, from a server computing device, the segmentation information. The segmentation information indicates one or more foreground segments of the decoded video for the current unit of the video sequence. The conferencing tool then applies a trained post-processing model to the foreground segment(s) of the decoded video for the current unit of the video sequence. The conferencing tool does not, however, apply the trained post-processing model to one or more other segments of the decoded video for the current unit of the video sequence (e.g., one or more background segments). The trained post-processing model can be an SR/VR model or VR model. By selectively applying a post-processing model to only the foreground segment(s) of decoded video, the conferencing tool can enhance the quality of the foreground segment(s) of the decoded video while avoiding the computational overhead of applying the post-processing model to other segments of the decoded video, where quality improvements would not be as noticeable.

According to a third set of techniques and tools described herein, a client computing device that implements a conferencing tool performs adaptive post-processing of decoded video that depends on results of video quality analysis. The conferencing tool receives encoded data in a bitstream for a current unit (e.g., frame) of a video sequence. The conferencing tool decodes the encoded data, producing decoded video for the current unit of the video sequence. The conferencing tool determines whether or not to perform post-processing based at least in part on results of video quality analysis. Responsive to determining to perform post-processing, the conferencing tool applies a trained post-processing model to at least some of decoded video for the video sequence (e.g., the decoded video for the for the current unit of the video sequence and/or decoded video for one or more subsequent units of the video sequence). The trained post-processing model can be an SR/VR model or VR model. For example, in some implementations, the conferencing tool performs video quality analysis on the decoded video for the current unit of the video sequence. In such implementations, the determination of whether or not to perform post-processing depends on results of the video quality analysis on the decoded video for the current unit of the video sequence. Alternatively, the determination of whether or not to perform post-processing can depend on results of the video quality analysis on decoded video for a previous unit of the video sequence, as reflected in one or more target characteristics of encoded data for video that has been requested. Or, as another alternative, the conferencing tool receives, from a server computing device, the results of video quality analysis, and the determination of whether or not to perform post-processing depends on the received results of the video quality analysis. By selectively applying a post-processing model depending on results of video quality analysis, the conferencing tool can enhance the quality of the decoded video when effective to do so, while avoiding the computational overhead of applying the post-processing model to decoded video that already has high quality.

The innovations described herein can be implemented as part of a method, as part of a computer system (physical or virtual) configured to perform the method, or as part of a tangible computer-readable media storing computer-executable instructions for causing a processor system, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1 is a diagram illustrating an example architecture for training a scenario-specific ML model to use in adaptive post-processing of video in a conferencing tool.

FIGS. 2a-2e are diagrams illustrating example architecture for adaptive post-processing of video in a conferencing tool.

FIGS. 3a and 3b are flowcharts illustrating an example technique for selectively applying a post-processing model for video according to a combined implementation.

FIG. 4 is a flowchart illustrating an example technique for selectively applying a post-processing model for video depending on results of scenario detection.

FIG. 5 is a flowchart illustrating an example technique for selectively applying a post-processing model for video depending on results of segmentation.

FIG. 6 is a flowchart illustrating an example technique for selectively applying a post-processing model for video depending on results of video quality analysis.

DETAILED DESCRIPTION

Figure 2A:
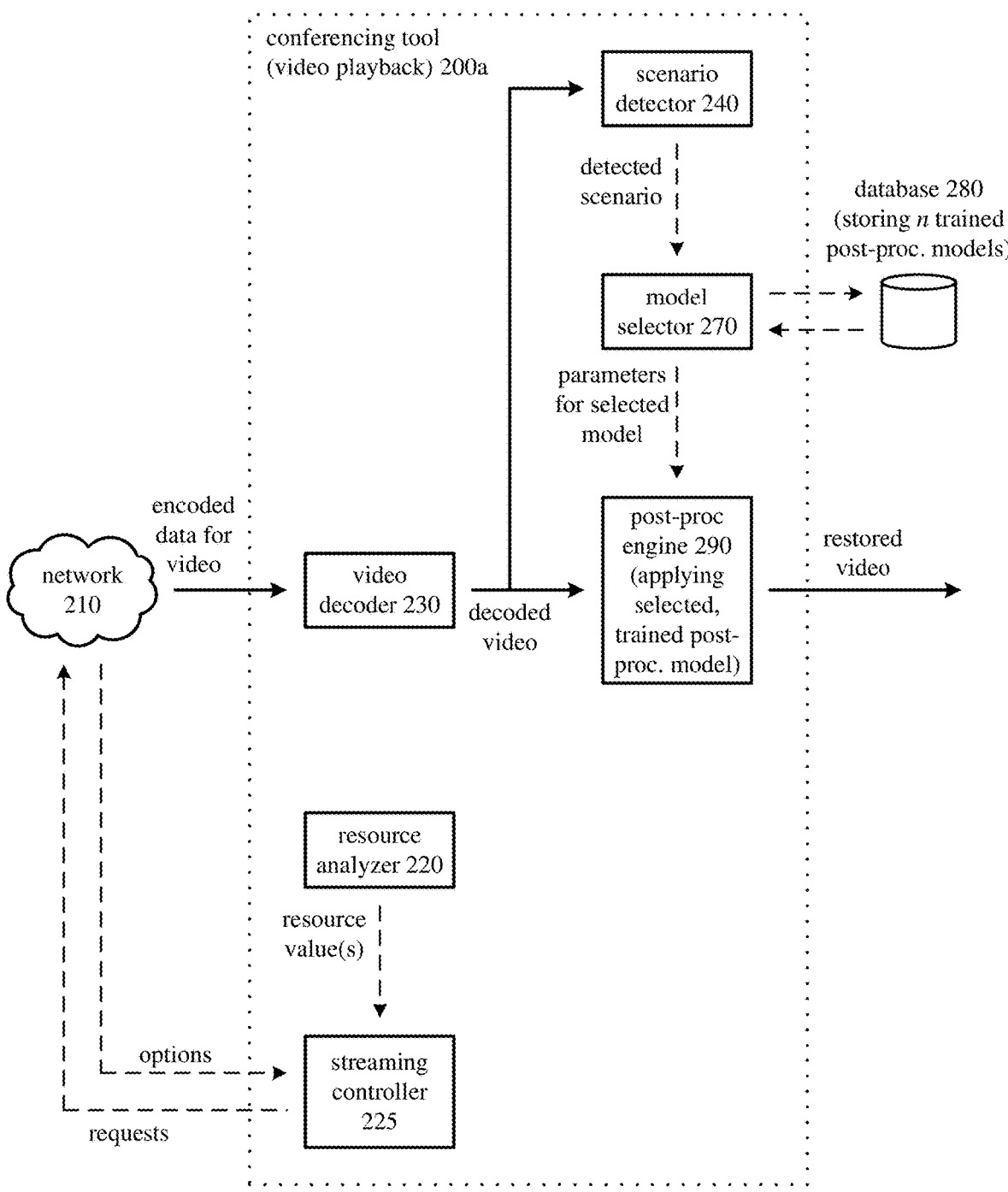

The detailed description presents innovations in machine learning ("ML") models used in adaptive post-processing of decoded video in a conferencing tool. The innovations include adaptive post-processing that depends on results of scenario detection, adaptive post-processing that depends on results of segmentation, and adaptive post-processing that depends on results of video quality analysis. With the innovations, which can be used in combination or separately, a conferencing tool can in effect provide video at higher quality without significantly increasing the network bandwidth consumed by the video or, alternatively, provide video using less network bandwidth without significantly hurting the quality of the video.

I. Example Architectures for Training Scenario-Specific Post-Processing Models for Video.

FIG. 1 shows an example architecture of a training tool (100) for training a post-processing model to use in post-processing of decoded video. The example architecture includes a video encoder (110), video decoder (130), post-processing model (170), and reward function evaluation module (190). Depending on implementation, the post-processing model (170) can be a super-resolution ("SR")/video restoration ("VR") model, a VR model, or another type of ML model.

During training, the training tool (100) is provided with extensive examples input video, which the training tool (100) can use to determine how restored video should appear without compression artifacts and/or after upsampling. After training, artifacts can be identified as known features by the post-processing model. During runtime inference, the post-processing model can leverage patterns learned in the training tool (100) with reference to original reference material (input video) to mitigate artifacts that have been introduced during encoding or upsampling.

FIG. 1 shows training of a scenario-specific post-processing model. The input video includes a large data set of video sequences for a specific video conferencing scenario, such as talking head video, conference room video, screen capture video, or whiteboard video. Different scenario-specific post-processing models can be trained for different video conferencing scenarios using data sets of video sequences for those scenarios, respectively.

The video encoder (110) is configured to accept, as input, an input frame, encode the input frame, and produce, as output, encoded data for the frame. The encoded data can be formatted according to the H.264/AVC standard, H.265/ HEVC standard, H.266/VVC standard, AV1 standard, or another codec standard or format.

When the post-processing model (170) is an SR/VR model, the input video can be downsampled before encoding. For example, the input video can have its spatial resolution reduced before the video encoder (110) or reduced by the video encoder (110). The input video can be downsampled by a factor of 2:1, 4:1, or another downsampling factor, with the post-processing model (170) compensating for the downsampling by upsampling by a corresponding upsampling factor.

Various other processing (not shown) can also be performed before the video encoder (110). For example, the training tool (100) can perform noise reduction to remove camera noise. As another example, the training tool (100) can perform segmentation to identify foreground segments in the video, and also perform blurring of background segments or removal of background segments.

The video decoder (130) is configured to accept, as input, encoded data for the frame, decode the encoded data for the frame, and produce, as output, a decoded frame. The video decoder (130) can be configured to perform decoding operations according to the H.264/AVC standard, H.265/HEVC standard, H.266/VVC standard, AV1 standard, or another codec standard or format.

The video encoder (110) and video decoder (130) can skip certain operations such as entropy coding operations and entropy decoding operations, which are lossless and hence do not affect video quality. As such, the encoded data that is output from the video encoder (110) and input to the video decoder (130) can be part of a bitstream organized according to a codec standard or format, or the encoded data can be an intermediate representation of the encoded data. In other words, the compression and decompression, respectively, can be partial.

The post-processing model (170) is configured to accept, as input, a decoded frame, perform post-processing operations on the decoded frame, and produce, as output, a restored frame. In particular, the post-processing model (170) is configured to perform post-processing operations on sample values of the decoded frame. The post-processing operations react to patterns of features in content according to parameters of the post-processing model (170), which have initial values but are extensively modified during training. In terms of recognizable outcomes, depending on content of input and training of the post-processing model (170), the post-processing operations can accomplish effects such as color mapping, sharpening, blurring, or other filtering. The post-processing model (170) can be a model that uses second-order grid propagation and flow-guided deformable alignment as described in Chan et al., "Basic VSR++: Improving Video Super-Resolution with Enhanced Propagation and Alignment" (2021). Alternatively, the post-processing model (170) can be a residual dense network as described in Zhang et al., "Residual Dense Network for Image Super-Resolution" (2018). Alternatively, the post-processing model (170) can be a generative adversarial network as described in Wang et al., "Esrgan: Enhanced Super-Resolution Generative Adversarial Networks" (2018), or another generative adversarial network, which can be trained as described in Liang et al., "Details or Artifacts: a Locally Discriminative Learning Approach to Realistic Image Super-Resolution" (2022). Alternatively, the post-processing model (170) can be a convolutional neural network having a U-Net architecture, or the post-processing model (170) can implement another type of ML model, such as a transformer network. Additional aspects of example post-processing models are described with reference to FIG. 2a.

When segmentation has been performed to identify foreground segments, the post-processing model (170) can be trained to perform post-processing operations on foreground segments, ignoring other segments of decoded video (such as background segments that are removed or blurred). The post-processing model (170) can accept as input segmentation information usable to identify foreground segments in the decoded video.

The reward function evaluation module (190) is configured to accept, as inputs, the input frame and restored frame. The input frame serves as a "ground truth" against which the result from the post-processing model (170)—that is, the restored frame—is measured. The reward function evaluation module (190) is configured to evaluate differences between the input frame and restored frame. The differences between the input frame and restored frame can be quantified according to a reward function (alternatively called a loss function). The reward function evaluation module (190) is configured to produce, as output, feedback to the post-processing model (170). Based on the feedback, the post-processing model (170) is adjusted.

When implemented as an SR/VR model, the post-processing model (170) can perform SR operations at increased spatial resolution after an input expansion, compared to the spatial resolution of the decoded frame provided to the post-processing model (170). When the post-processing model (170) performs operations at increased spatial resolution, the input frame ("ground truth") provided to the reward function evaluation module (190) has a spatial resolution that matches the spatial resolution of the restored frame. In this case, the reward function evaluation module (190) is configured to evaluate differences between the input frame and restored frame. Based on feedback from the reward function evaluation module (190), the post-processing model (170) learns to both restore the decoded frame (mitigating compression artifacts) and upsample the decoded frame to the spatial resolution of the input frame. For example, suppose input video has a spatial resolution of 2160p (that is, 3840×2160), the input video is downsampled before or during compression to a spatial resolution of 1080p (that is, 1920×1080), the post-processing model (170) is configured to accepted decoded video that has a spatial resolution of 1080p, and the post-processing model (170) is configured to produce restored video at a spatial resolution of 2160p. In this case, the reward function evaluation module (190) accepts (as "ground truth" input) frames of the 2160p input video. Based on feedback from the reward function evaluation module (190), the post-processing model (170) learns to both restore the 1080p decoded video and upsample the 1080p decoded video to the spatial resolution of 2160p based on the 2160 input video.

Training can repeat in training iterations for different batches (subsets) of input data in a training set, for an epoch (a pass through the data in the training set). The process of training the post-processing model (170) can continue for multiple epochs until the post-processing model (170) reaches a convergence threshold. For example, the convergence threshold can be used to determine whether parameters of the post-processing model (170) have stabilized (e.g., changes in parameters are below a threshold amount, which depends on implementation). Or, as another example, the convergence threshold can be used to determine whether differences between input video and restored output from the post-processing model (170) are negligible (e.g., the value of the reward function has reached a threshold amount, which depends on implementation).

In general, with the feedback from the reward function evaluation module (190), the post-processing model (170) is exposed to examples of input video during the training process. The post-processing model (170) can gradually learn to associate features found in the decoded video with features in the input video as "ground truth" for the video. During subsequent runtime inference, the trained post-processing model can use the learned patterns to mitigate compression artifacts that were introduced during encoding, perform upsampling to compensate for downsampling, and otherwise restore image quality lost during compression.

In some example implementations, the reward function evaluation module (190) provides feedback to the post-processing model (170) according to a reward function for actor-critic reinforcement learning. For the post-processing model (170), an actor path provides a "player" or decision-maker during training. The actor selects an action (here, determining the output of the post-processing model (170)) based on a policy, as reflected in the configuration of the post-processing model (170). A critic path provides an "observer" (here, the reward function evaluation module (190)), who grades the performance of the actor. The critic assesses whether being in the state that results from the action selected by the actor is valuable or not valuable. The critic quantifies whether the action is valuable or not valuable using a reward function. The reward function can implement an objective measure of quality degradation between sample values of the input frame and corresponding sample values of the restored frame, such as mean squared error, peak signal-to-noise ratio, a structural similarity index, a multi-scale structural similarity index, video multimethod assessment fusion ("VMAF"), or a result from an ML model using a long short-term memory ("LSTM") network. Based on the value of the reward function, the post-processing model (170) is adjusted. For example, if one or more weight values or bias values have been adjusted in an iteration of training the post-processing model (170), and the resulting value of the reward function increases, the training process keeps the adjusted values or increases the magnitude of the previous adjustments in the next iteration of training. On the other hand, if the resulting value of the reward function decreases, the training process reverses the previous adjustments (to weight value(s) and/or bias value(s)) or decreases the magnitude of the previous adjustments in the next iteration of training. In general, the training process continues until the post-processing model (170) reaches a convergence threshold.

In the preceding examples, the post-processing model (170) is trained using a variation of actor-critic reinforcement learning. Alternatively, the post-processing model (170) can be trained using another type of reinforcement learning. Or, as another alternative, the post-processing model (170) can be trained using supervised learning, unsupervised learning, or another variation of machine learning.

The training tool (100) can skip the adjustment of the post-processing model for some units of video. For example, the training tool (100) aggregates the feedback for the current frame with other feedback (from previous frames). In this case, the adjustment of the post-processing model can use the aggregated feedback for the current frame after skipping the adjustment for the previous frames, or the adjustment of the post-processing model can be skipped for the current frame.

In FIG. 1, the post-processing model (170) is trained for a specific type of video conferencing scenario, such as talking head video, conference room video, or screen capture video. The post-processing model (170) is adapted to perform post-processing for that type of video. Different post-processing models can be used for different scenarios. Alternatively, a given post-processing model can be trained for various video conferencing scenarios, such that the given post-processing model is adapted to perform post-processing for any arbitrary type of video conferencing scenario.

In some example implementations, the post-processing model (170) can be adapted for a particular context in various other respects. For example, video can be compressed and decompressed using a specific codec standard or format that is intended to be used for runtime inference. In this case, the post-processing model (170) is adapted to perform post-processing of decoded video that has been compressed and decompressed for the specific codec standard or format. More specifically, the post-processing model (170) can be adapted for a particular profile of a codec standard or format. Different post-processing models can be used for different codec standards or formats, or for different profiles of a codec standard or format. Alternatively, a single (larger) post-processing model can be used for multiple different codec standards or formats, or for different profiles of a codec standard or format.

As another example, during training of the post-processing model (170), encoded data can be compressed at a given target quality, bitrate, or spatial resolution. In this case, the post-processing model (170) is further adapted to perform post-processing of decoded video that has been compressed at the given target quality, bitrate, or spatial resolution. In particular, in some example implementations, the post-processing model is trained to restore video that has been aggressively compressed to low quality and/or at low spatial resolution. Different post-processing models can be used for different target qualities, bitrates, or spatial resolutions. Alternatively, a single (larger) post-processing model can be used for a range of different target qualities, bitrates, or spatial resolutions.

Although some operations explained with reference to FIG. 1 involve processing of a frame of video as input or output from different components, the example architecture of the training tool (100) can be configured to process other units of video, such as slices or tiles. For example, the video encoder (110) can be configured to encode a slice or tile and produce encoded data for the slice or tile, the video decoder (130) can be configured to decode a slice or tile and produce the decoded slice or tile for post-processing, and the post-processing model (170) can be configured to perform post-processing operations on a decoded slice or tile. Processing of sub-frame units of video can provide more opportunities for parallel processing. Processing of sub-frame units of video can also reduce memory usage because features need not be stored for an entire frame. Alternatively, using additional memory to store additional frames of decoded video, a post-processing model (170) can perform post-processing operations for upsampling and/or quality improvement based on information in multiple frames.

Although some preceding examples of operations for FIG. 1 involve serial processing of a single video frame, various operations of the pipeline can be performed in parallel for different video frames. Parallel processing can reduce overall latency and also utilize available hardware more completely. For example, while post-processing operations are performed by the post-processing model (170) for a given frame n, decoding operations can be performed by the video decoder (130) for a subsequent frame n+1, and encoding operations can be performed by the video encoder (110) for a subsequent frame n+2.

As another example, parallel processing can be performed for sub-frame units such as slices or tiles. While post-processing operations are performed by the post-processing model (170) for a given slice or tile, decoding operations can be performed by the video decoder (130) for a subsequent (second) slice or tile, and encoding operations can be performed by the video encoder (110) for the next (third) slice or tile. Performing operations at the granularity of sub-frame units can reduce latency (one stage in the pipeline can begin after the prior stage has completed a single sub-frame unit, rather than having to wait for the entire frame to finish).

To the extent the video encoder (110), video decoder (130), and post-processing model (170) individually support parallel processing of sub-frame units, there are even more opportunities for parallel processing. For example, while post-processing operations are performed by the post-processing model (170) for multiple slices or tiles of frame n, decoding operations can be performed by the video decoder (130) for multiple slices or tiles of frame n+1, and encoding operations can be performed by the video encoder (110) for multiple slices or tiles of frame n+2.

II. Example Architectures for Adaptively Applying a Post-Processing Model for Video.

Once post-processing models have been trained for post-processing of decoded video, the trained post-processing models can be deployed for inference at runtime. FIGS. 2a-2e show example architectures for adaptive post-processing of video in a conferencing tool.

FIGS. 2a-2e show components of conferencing tools that are part of a video processing pipeline. Other components of the conferencing tools—such as components that are part of call setup, negotiation, and closing, an audio processing pipeline, an instant messaging pipeline, and an application sharing pipeline—are not shown.

A. Example Architectures for Selectively Applying a Post-Processing Model for Video Depending on Results of Scenario Detection.

FIG. 2a shows an example architecture of a conferencing tool (200a) for adaptive post-processing of decoded video that depends on results of scenario detection. The adaptive post-processing uses playback-side inference with a selected, trained post-processing model. The conferencing tool (200a) includes a resource analyzer (220), a streaming controller (225), a video decoder (230), a scenario detector (240), a model selector (270), and a post-processing engine (290).

The resource analyzer (220) is configured to analyze resources of the computing device that implements the conferencing tool (200a) and provide one or more indicators of resource values to the streaming controller (225). For example, the resources can include a default spatial resolution (e.g., of a screen for display), available network bandwidth, available processing resources for post-processing, and/or other types of resources. In some example implementations, the resource analyzer (220) is configured to detect the spatial resolution of video for display (e.g., resolution of a screen) and provide an indicator of display resolution to the streaming controller (225). Alternatively, the resource analyzer (220) is configured to provide other and/or additional indicator(s) of resource value(s) to the streaming controller (225).

The streaming controller (225) is configured to accept the indicator(s) of resource value(s), receive (from a video conferencing service or encoder-side controller) indicators of options for encoded data for video to request (e.g., spatial resolutions, quality levels for versions of video), determine one or more target characteristics of video to request, and request encoded data for video having the target characteristic(s) from the video conferencing service or encoder-side controller. For example, the target characteristic(s) include a target spatial resolution and/or target quality.

In some example implementations, as part of bitrate negotiation before or during conferencing, the streaming controller (225) is configured to request encoded data for video having a target spatial resolution. The video conferencing service or encoder-side controller provides encoded data for video, having the target spatial resolution, at a highest available quality level subject to limitations on network bandwidth for delivery. Depending on available network bandwidth or other considerations, the video conferencing service or encoder-side controller may provide encoded data for video at a lower quality level for the target spatial resolution. The video conferencing service or encoder-side controller does not provide encoded data for video at a higher spatial resolution than can be displayed. Within this framework, as part of bitrate negotiation before or during conferencing, the streaming controller (225) can preemptively request encoded data for video having a target spatial resolution lower than a default spatial resolution (for a display screen), relying on a trained post-processing model to perform upsampling from the (lower) target spatial resolution to the default spatial resolution. For example, based on available network bandwidth being below a bandwidth threshold, the streaming controller (225) requests video at a target spatial resolution lower than the default spatial resolution. Or, as another example, based on the available processing resources for post-processing being above a processing resources threshold, the streaming controller (225) requests video at a target spatial resolution lower than the default spatial resolution, and the available processing resources are used for post-processing of decoded video.

In other example implementations, as part of bitrate negotiation before or during conferencing, the streaming controller (225) is configured to request encoded data for video having a target quality. The video conferencing service or encoder-side controller provides encoded data for video, having the target quality, subject to limitations on network bandwidth for delivery. Depending on available network bandwidth or other considerations, the video conferencing service or encoder-side controller may provide encoded data for video at a lower quality level than the target quality. Within this framework, as part of bitrate negotiation before or during conferencing, the streaming controller (225) can preemptively request encoded data for video having a target quality lower than a default quality (for the conferencing tool), relying on a trained post-processing model to perform post-processing to improve quality. For example, based on available network bandwidth being below a bandwidth threshold, the streaming controller (225) requests video at a target quality lower than the default quality. Or, as another example, based on the available processing resources for post-processing being above a processing resources threshold, the streaming controller (225) requests video at a target quality lower than the default quality, and the available processing resources are used for post-processing.

In this way, as part of bitrate negotiation before or during conferencing, the streaming controller (225) can selectively request encoded data for video at a lower spatial resolution or lower quality when appropriate to do so based on limits on network bandwidth, availability of processing resources for post-processing, and/or other factors. As part of managing utilization of network bandwidth and available processing resources, the streaming controller (225) can consider potential gains (in terms of bitrate reduction and/or quality improvement) against computational overhead of applying a post-processing model. For example, if bitrate will drop significantly without a noticeable decrease in quality (after applying a post-processing model), the streaming controller (225) may request video at a lower spatial resolution or lower quality, so long as resources are available to apply the post-processing model. Thus, if network bandwidth limitations are an issue but computing resources at a client computing device are not, the streaming controller (225) can request a lower spatial resolution of encoded video, in order to save network bandwidth, and the post-processing model can restore spatial resolution and video quality. On the other hand, if bitrate would not drop significantly, the streaming controller (225) may request video at a default spatial resolution or default quality, and avoid the computational overhead of applying the post-processing model.

The streaming controller (225) can be configured to determine target characteristic(s) of video to request when conferencing begins. The streaming controller (225) can also be configured to reassess target characteristic(s) of video to request during conferencing (e.g., every x seconds, where x is a value such as 10, 30, or 60; every n frames of video, where n is value such as 1, 15, or 150; or every new scene, with new scenes identified using an ML model configured to detect scene changes).

In many examples described herein, the streaming controller (225) requests encoded data for video at a lower spatial resolution or lower quality, in anticipation of applying a post-processing model to restore spatial resolution and quality. Alternatively, a video conferencing service or encoder-side controller can preemptively decide to provide to a client computing device encoded data for video at a lower spatial resolution or lower quality, in anticipation of the client computing device applying a post-processing model to restore spatial resolution and quality, based on the client computing device reporting that it has the capability to apply the post-processing model.

At the encoder-side, a video frame can be downsampled before encoding. For example, a video frame can have its spatial resolution reduced by a camera, by another component before encoding, or by a video encoder. For example, the video frame can be downsampled by a factor of 2:1, 4:1, or another downsampling factor. (The post-processing model will compensate for the downsampling by upsampling by a corresponding upsampling factor.) The downsampled video frame is then encoded, and encoded data for the video frame is delivered via a network (210) such as the Internet to the conferencing tool (200a). (In practice, encoded data can be delivered for a sub-frame unit such as a slice or tile of a frame, as explained below.)

The video decoder (230) is configured to accept, as input, encoded data for a unit of a video sequence, such as a frame or slice. The video decoder (230) is configured to receive the encoded data from the network (210). The encoded data that is input to the video decoder (230) can be part of a bitstream organized according to the H.264/AVC standard, H.265/HEVC standard, H.266/VVC standard, AV1 standard, or another codec standard or format. The video decoder (230) is configured to decode the encoded data for the unit of video and produce, as output, decoded video for the unit. Specifically, the video decoder (130) is configured to perform decoding operations according to the codec standard or format.

The scenario detector (240) is configured to detect a scenario in the decoded video for the unit of the video sequence and output an indication of the detected scenario. The scenario detector (240) uses a scenario detection model. In some example implementations, the scenario detection model is configured to identify objects such as faces in the decoded video. For example, the scenario detection model uses object detection as described in Viola et al., "Rapid Object Detection Using a Boosted Cascade of Simple Features" (2001). Alternatively, the scenario detection model uses object detection according to another architecture. In any case, with the scenario detection model, the scenario detector (240) can consider the sizes of detected objects (such as faces) and count of detected objects (such as faces). For example, if the decoded video includes a single large face, the scenario detector (240) determines that the scenario of the decoded video is talking head video. On the other hand, if the decoded video includes multiple small faces, the scenario detector (240) determines that the scenario of the decoded video is conference room video. The scenario detector (240) can also consider metadata that indicates one or more content characteristics of the unit of the video sequence.

Aside from object detection, the scenario detector (240) can be configured to perform other types of analysis (e.g., evaluation of ranges of sample values or histograms of sample values, to detect screen capture content).

More generally, the scenario detection model can be an ML model configured to accept, as input, sample values of the decoded video for the unit of the video sequence and configured to produce, as output, the indication of the detected scenario. The ML model can also be configured to accept, as input, metadata that indicates one or more content characteristics of the unit of the video sequence. The ML model can be trained on different classes (video conferencing scenarios) of video in a supervised training process, with labels of video sequences indicating the video conferencing scenarios (e.g., talking head video, conference room video, screen capture video) for input video sequences.

The scenario detector (240) can be configured perform scenario detection at the beginning of a conference, after decoded video is received. The scenario detector (240) can also be configured to perform scenario detection again during a conference (e.g., every x seconds, where x is a value such as 10, 30, or 60; every n frames of video, where n is value such as 1, 15, or 150; or every new scene, with new scenes identified using an ML model configured to detect scene changes). In this way, if a camera for a video stream changes focus from a single person to a conference room, whiteboard in the conference room, or document, or vice versa, the scenario detector (240) can update the scenario that is detected, and the post-processing engine (290) can react to the change. When the post-processing engine (290) does not receive an indicator of a detected scenario for decoded video for a current unit, the post-processing engine (290) continues to make decisions based on the indicator of the detected scenario provided for decoded video for the most recent previous unit.

In FIG. 2a, the scenario detector (240) is implemented as part of a conferencing tool of a client computing device. Alternatively, a scenario detector can be implemented as part of a conferencing tool of a server computing device, for example, a server computing device that encodes video and transmits the encoded video, or an intermediate server computing device that streams encoded video for delivery. In this case, the scenario detector is configured to detect a scenario in video for a unit of a video sequence and output, to the client computing device, an indication of the detected scenario, which is provided to the model selector (270). The scenario detector can use a scenario detection model, which is implemented as described above, and can perform scenario detection at the beginning of a conference or during a conference at any of various intervals.

The model selector (270) is configured to select between multiple scenario-specific, trained post-processing models. In some example implementations, the indication of the detected scenario (output by the scenario detector (240) or received from a server computing device) is an identifier of one of the multiple scenario-specific, trained post-processing models, and the model selector (270) is configured to simply use the indicator of the detected scenario to select the identified post-processing model. Alternatively, the model selector (270) can itself be an ML model that is configured to accept, as input, indicia of the detected scenario, map the indicia to an identifier of one of the multiple scenario-specific, trained post-processing models, and select the identified post-processing model. Such an ML model can be trained on different classes (indicia of scenarios) in a supervised training process, with labels indicating scenarios and corresponding scenario-specific, trained post-processing models.

The database (280) stores n scenario-specific, trained post-processing models, where n depends on implementation (e.g., n is 2, 4, or 8). A given post-processing model is configured to perform post-processing operations for a given video conferencing scenario. Example video conferencing scenarios include talking head video, conference room video, and screen capture video. Alternatively, example video conferencing scenarios include action video, close-up video, and slideshow video. For each of the n scenario-specific, trained post-processing models, the database (280) stores parameters for the post-processing model (e.g., weights, bias values). The model selector (270) is configured to provide parameters for the selected, trained post-processing model to the post-processing engine (290), which uses the parameters to implement the selected, trained post-processing model.

The post-processing engine (290) is configured to accept, as input, decoded video for a unit of a video sequence, perform post-processing operations on the decoded video by applying the selected, trained post-processing model, and produce, as output, restored video for the unit of the video sequence. The trained post-processing model can be a model that uses second-order grid propagation and flow-guided deformable alignment as described in Chan et al., "Basic VSR++: Improving Video Super-Resolution with Enhanced Propagation and Alignment" (2021). Alternatively, the trained post-processing model can be a residual dense network as described in Zhang et al., "Residual Dense Network for Image Super-Resolution" (2018). Alternatively, the post-processing model (170) can be a generative adversarial network as described in Wang et al., "Esrgan: Enhanced Super-Resolution Generative Adversarial Networks" (2018), or another generative adversarial network, which can be trained as described in Liang et al., "Details or Artifacts: a Locally Discriminative Learning Approach to Realistic Image Super-Resolution" (2022). Alternatively, the trained post-processing model can be a convolutional neural network having a U-Net architecture, or the trained post-processing model can implement another type of ML model, such as a transformer network.

The trained post-processing model can be an SR/VR model configured to increase spatial resolution, mitigate compression artifacts, and mitigate upsampling artifacts introduced when increasing spatial resolution. For an SR/VR model, spatial resolution increases between input to and output from the model, thereby restoring spatial resolution. An SR/VR model is configured for a given upsampling factor such as 1:2, 1:4, or another ratio. In general, the artifacts that are mitigated by the SR/VR model can include blocking artifacts, blurring artifacts, banding artifacts, ringing artifacts, and/or another type of compression artifact, as well as artifacts introduced by upsampling. For screen capture video, the SR/VR model can be trained to sharpen text, remove jagged edges in text, and remove blurriness in text introduced by upsampling.

Alternatively, the trained post-processing model can be a VR model configured to mitigate compression artifacts. For a VR model, spatial resolution is unchanged between input to and output from the model. In general, the compression artifacts that are mitigated by the VR model can include blocking artifacts, blurring artifacts, banding artifacts, ringing artifacts, and/or another type of compression artifact. For screen capture video, the VR model can be trained to sharpen text, remove jagged edges in text, and remove blurriness in text introduced by upsampling.

Alternatively, the trained post-processing model can be configured to operate in an SR/VR mode (for upscaling and quality improvement) or VR mode (for quality improvement), depending on whether spatial resolution should be increased between the decoded video and restored video. Or, as another alternative, the trained post-processing model can be a different type of ML model.

Different scenario-specific post-processing models can be the same type of ML model, albeit trained using different video content for different video conferencing scenarios. Alternatively, different scenario-specific post-processing models can be different types of ML models, still trained using different video content for different video conferencing scenarios. Different types of ML models can have different complexity. For a given scenario, the most effective type of ML model can be selected, or a less complex but still effective type of ML model can be selected.

In some example implementations, in addition to being adapted for a specific video conferencing scenario, a trained post-processing model can be adapted for a particular context in various respects. For example, the post-processing model can be adapted to perform post-processing of decoded video that has been compressed and decompressed for a specific codec standard or format. More specifically, a post-processing model can be trained for a particular profile of a codec standard or format. Different post-processing models can be used for different codec standards or formats, or for different profiles of a codec standard or format. Alternatively, a single (larger) post-processing model can be used for multiple different codec standards or formats, or for multiple profiles of a codec standard or format.

As another example, the post-processing model can be adapted to perform post-processing of decoded video that has been compressed at the given target quality, bitrate, or spatial resolution. In particular, in some example implementations, the post-processing model is trained to restore video that has been aggressively compressed to low quality and/or low spatial resolution. Different post-processing models can be used for different target qualities, bitrates, or spatial resolutions. When different post-processing models are trained for different target quality levels, bitrates, or spatial resolutions, a given client computing device can have the different post-processing models installed or otherwise available. An appropriate one of the post-processing models can be selected at runtime based on current conditions. If the conditions change, the selected post-processing model can be dynamically switched to a different post-processing model during runtime. Alternatively, a single (larger) post-processing model can be used for a range of different target qualities, bitrates, or spatial resolutions.

Although some operations explained with reference to FIG. 2a involve processing of a frame of video as input or output from different components, the example architecture of the conferencing tool (200a) can be configured to process other units of video, such as slices or tiles. For example, the video decoder (130) can be configured to decode a slice or tile and produce the decoded slice or tile for post-processing, and the post-processing engine (290) can be configured to perform post-processing operations on a decoded slice or tile. Processing of sub-frame units of video can provide more opportunities for parallel processing. Processing of sub-frame units of video can also reduce memory usage because features need not be stored for an entire frame. Alternatively, using additional memory to store additional frames of decoded video, a post-processing model can perform post-processing operations for upsampling and/or quality improvement based on information in multiple frames.

In particular, unlike typical image post-processing (in which each image, frame, slice, tile, etc. is processed independent of others), video post-processing can involve processing of multiple frames that are consecutive in display order. Often, consecutive frames are temporally redundant to some extent. In many cases, by using information from multiple consecutive frames, a trained post-processing model can provide results that are more temporally consistent and accurate. Temporal redundancy can be exploited by providing the most recent n frames as input to the trained post-processing model (where n is a value such as 2, 3, 4, 5, or more) or by using some form of recurrent feedback in the trained post-processing model to update the state of the model. Chan et al., "Basic VSR++: Improving Video Super-Resolution with Enhanced Propagation and Alignment" (2021) describes one possible approach for a trained post-processing model to use information from multiple consecutive frames. Alternatively, a trained post-processing model can use another approach.

Various operations of the pipeline shown in FIG. 2a can be performed in parallel for different video frames. Parallel processing can reduce overall latency and also utilize available hardware more completely. For example, while post-processing operations are performed by the post-processing engine (290) for a given frame n, decoding operations can be performed by the video decoder (230) for a subsequent frame n+1.

As another example, parallel processing can be performed for sub-frame units such as slices or tiles. While post-processing operations are performed by the post-processing engine (290) for a given slice or tile, decoding operations can be performed by the video decoder (230) for a subsequent (second) slice or tile. Performing operations at the granularity of sub-frame units can reduce latency, as explained with reference to FIG. 1. To the extent the video decoder (230) and post-processing engine (290) individually support parallel processing of sub-frame units, there are even more opportunities for parallel processing. For example, while post-processing operations are performed by the post-processing engine (290) for multiple slices or tiles of frame n, decoding operations can be performed by the video decoder (230) for multiple slices or tiles of frame n+1.

The example architecture shown in FIG. 2a can include one or more other components (not shown) configured to perform rendering operations for display. For example, the other component(s) can be configured to accept, as input, a restored frame, perform rendering operations (for color space conversion, color mapping, scaling, sharpening, or other filtering), and produce, as output for display, the frame. Rendering operations can be performed for a given frame n while post-processing operations are performed in parallel for subsequent video of frame n+1, and decoding operations are performed in parallel for subsequent video of frame n+2.

B. Example Architectures for Selectively Applying a Post-Processing Model for Video Depending on Results of Video Quality Analysis.

Figure 2B:
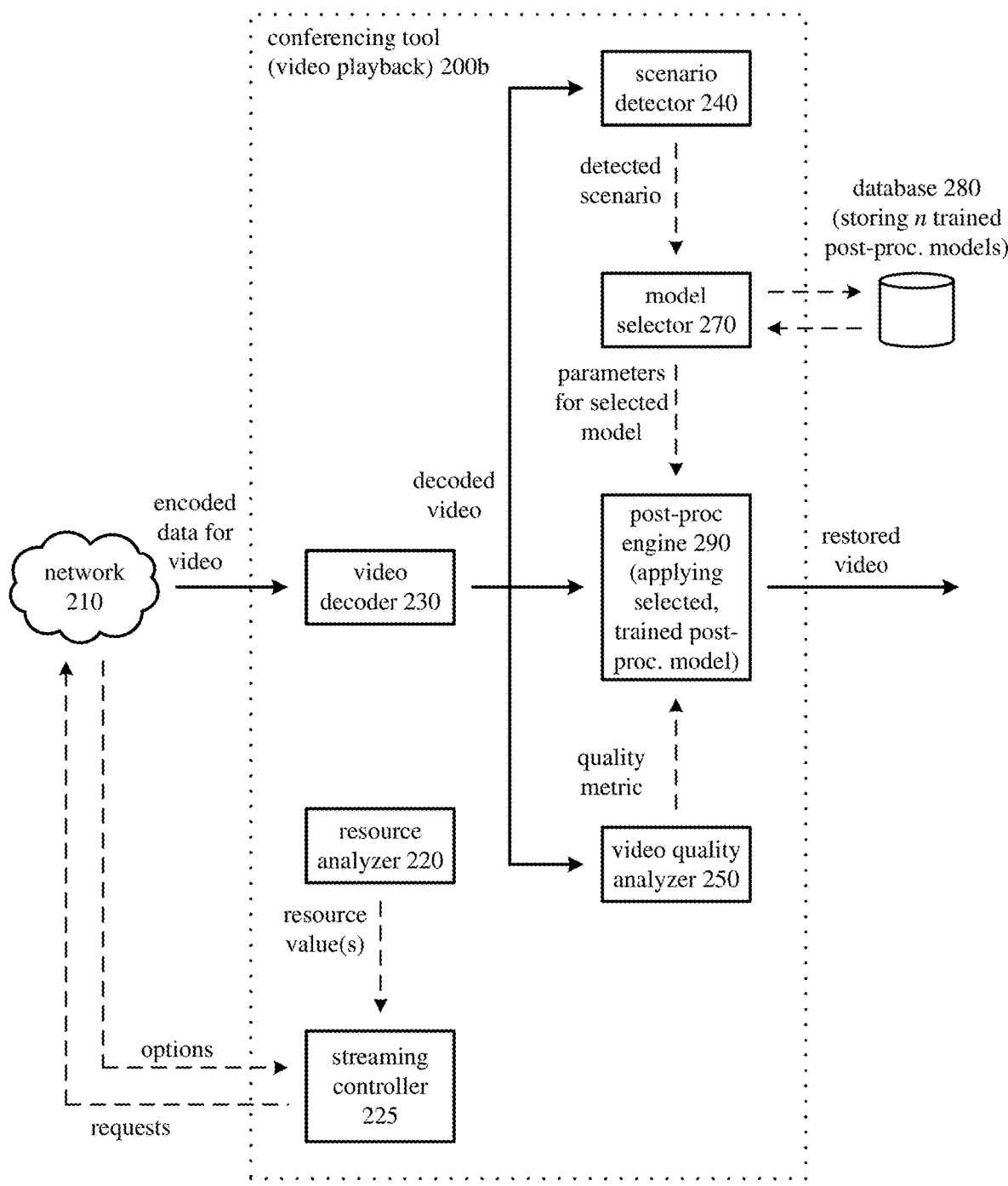

FIG. 2b shows an example architecture of a conferencing tool (200b) for adaptive post-processing of decoded video that depends on results of video quality analysis. The adaptive post-processing uses playback-side inference with a selected, trained post-processing model. The conferencing tool (200b) shown in FIG. 2b includes the components of the conferencing tool (200a) shown in FIG. 2a. In addition, the conferencing tool (200b) shown in FIG. 2b includes a video quality analyzer (250).

In the conferencing tool (200b), the resource analyzer (220), streaming controller (225), video decoder (230), scenario detector (240), model selector (270), and post-processing engine (290) are configured to operate as described with reference to FIG. 2a, except as indicated below. Interactions with the network (210) and database (280) occur as explained with reference to FIG. 2a.

The video quality analyzer (250) is configured to perform video quality analysis on the decoded video for a unit of the video sequence. In some example implementations, the video quality analyzer (250) includes an ML model with an LSTM network as described in Mittag et al., "LSTM-Based Video Quality Prediction Accounting for Temporal Distortions in Videoconferencing Calls" (2023). Alternatively, the video quality analyzer (250) uses an ML model with a different architecture to determine video quality using a metric such as VMAF.

The video quality analyzer (250) is configured to provide an indicator of a quality metric to the post-processing engine (290), which is configured to adapt post-processing using the indicator of the quality metric. For example, the post-processing engine (290) applies the trained post-processing model to decoded video when the quality metric is below a quality threshold, signifying that the quality of the decoded video is amenable to improvement by applying the trained post-processing model. On the other hand, the post-processing engine (290) skips application of the trained post-processing model to decoded video when the quality metric is above a quality threshold, signifying that the quality of the decoded video is already sufficient and the computational cost of applying the trained post-processing model is not warranted. In this way, the trained post-processing model can be applied to improve poor-quality video but not applied to video already having quality that is sufficiently high. This might be effective, for example, if computing resources for post-processing are limited, and occasionally a video stream has quality problems due to packet drops or other causes.

The video quality analyzer (250) can be configured to perform video quality analysis at the beginning of a conference, after decoded video is received. The video quality analyzer (250) can also be configured to perform scenario detection during a conference (e.g., every x seconds, where x is a value such as 10, 30, or 60; every n frames of video, where n is value such as 1, 15, or 150; or every new scene, with new scenes identified using an ML model configured to detect scene changes). In this way, if quality changes during a conference, the post-processing engine (290) can react to the change. When the post-processing engine (290) does not receive an indicator of a quality metric for decoded video for a current unit, the post-processing engine (290) continues to make decisions based on the indicator of the quality metric provided for decoded video for the most recent previous unit.

The video quality analyzer (250) can also be configured to provide the indicator of the quality metric to the streaming controller (225), which can use the quality metric when determining target characteristic(s) for video to request.

In FIG. 2b, the video quality analyzer (250) is implemented as part of a conferencing tool of a client computing device. Alternatively, a video quality analyzer can be implemented as part of a conferencing tool of a server computing device, for example, a server computing device that encodes video and transmits the encoded video, or an intermediate server computing device that streams encoded video for delivery. In this case, the video quality analyzer is configured to perform video quality analysis on video for a unit of a video sequence and output, to the client computing device, an indicator of a quality metric, which is provided to the post-processing engine (290). The video quality analyzer can use an ML model, which is implemented as described above, and can perform video quality analysis at the beginning of a conference or during a conference at any of various intervals.

C. Example Architectures for Selectively Applying a Post-Processing Model for Video Depending on Results of Segmentation.

Figure 2C:
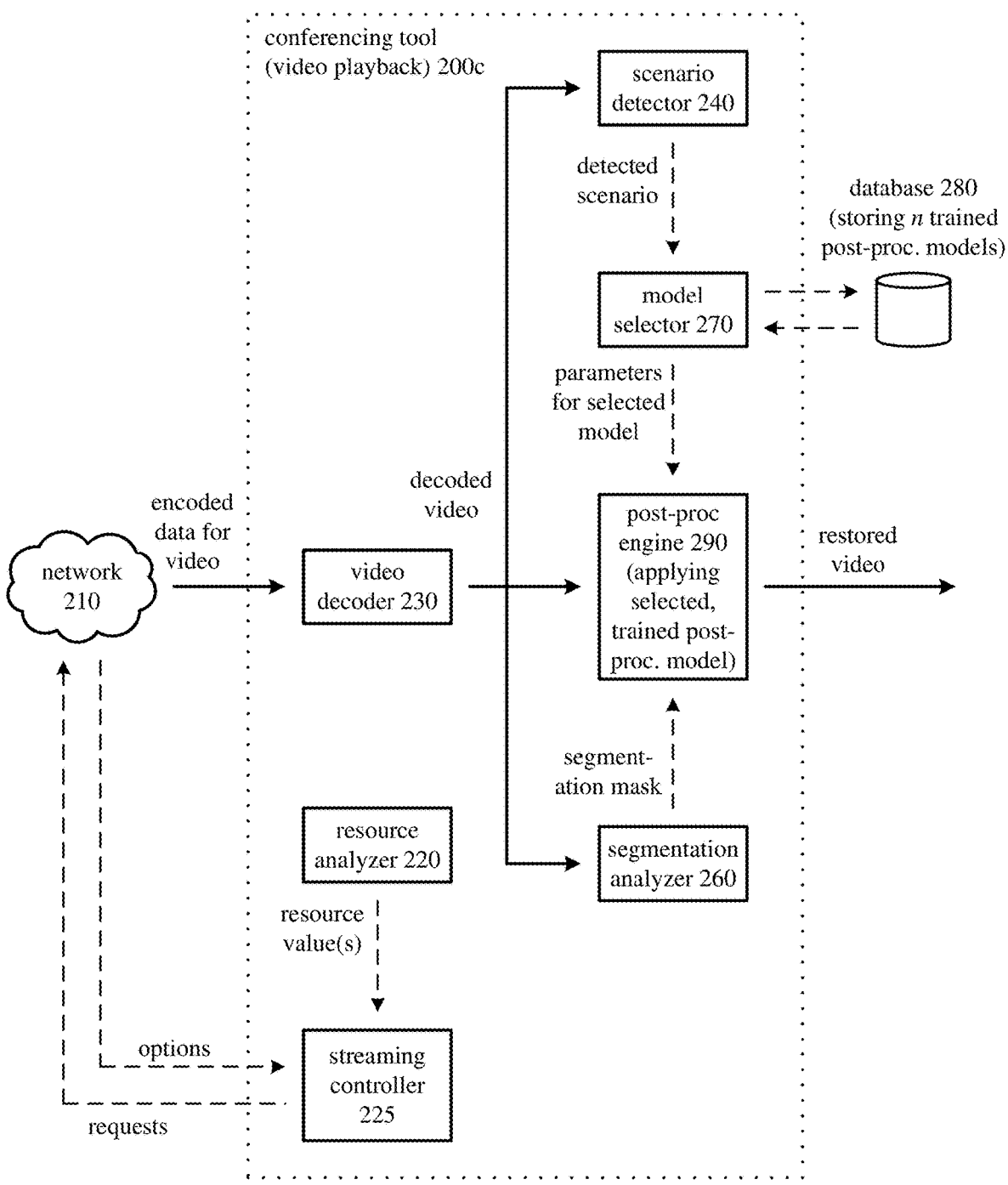

FIG. 2c shows an example architecture of a conferencing tool (200c) for adaptive post-processing of decoded video that depends on results of segmentation. The adaptive post-processing uses playback-side inference with a selected, trained post-processing model. The conferencing tool (200c) shown in FIG. 2c includes the components of the conferencing tool (200a) shown in FIG. 2a. In addition, the conferencing tool (200c) shown in FIG. 2c includes a segmentation analyzer (260).

In the conferencing tool (200c), the resource analyzer (220), streaming controller (225), video decoder (230), scenario detector (240), model selector (270), and post-processing engine (290) are configured to operate as described with reference to FIG. 2a, except as indicated below. Interactions with the network (210) and database (280) occur as explained with reference to FIG. 2a.

The segmentation analyzer (260) is configured to determine segmentation information for decoded video for a unit of the video sequence. In some example implementations, the segmentation analyzer (260) includes an ML model with a convolutional U-net architecture as described in Ronneberger et al., "U-Net: Convolution Networks for Biomedical Image Segmentation" (2015). Alternatively, the segmentation analyzer (260) uses an ML model with a different architecture. The segmentation analyzer (260) can also use metadata in the bitstream to determine segmentation information.

In general, the segmentation information indicates one or more foreground segments of the decoded video for a unit of the video sequence. For example, the segmentation information is a segmentation mask that indicates, for a given pixel location of the decoded video for the unit of the video sequence, whether the given pixel location is in a foreground segment or other segment. Alternatively, the segmentation information indicates, for a given pixel location of the decoded video for the unit of the video sequence, one of multiple layers of the decoded video for the current unit of the video sequence. The multiple layers include a foreground layer with the foreground segment(s). Alternatively, the segmentation information is organized in some other way.

The segmentation analyzer (260) is configured to provide the segmentation information to the post-processing engine (290), which is configured to adapt post-processing using the segmentation information. For example, using the segmentation information, the post-processing engine (290) applies the trained post-processing model to foreground segment(s) of the decoded video but not to other segments (e.g., background segments) of the decoded video. In this way, the trained post-processing model can be applied to improve quality of the foreground segment(s) without incurring the computational cost of applying the post-processing model to the other segments.

In FIG. 2c, the segmentation analyzer (260) is implemented as part of a conferencing tool of a client computing device. Alternatively, a segmentation analyzer can be implemented as part of a conferencing tool of a server computing device, for example, a server computing device that encodes video and transmits the encoded video, or an intermediate server computing device that streams encoded video for delivery. In this case, the segmentation analyzer is configured to determine segmentation information for video for a unit of a video sequence and output, to the client computing device, segmentation information that indicates foreground segment(s), which are provided to the post-processing engine (290). The segmentation analyzer can use an ML model, which is implemented as described above.

The post-processing engine (290) can conditionally apply the post-processing model to the foreground segment(s) but not background segment(s) of the decoded video for the unit of the video sequence. For example, the post-processing engine (290) determines whether or not the background segment(s) are in a static background or blurred background. The post-processing engine (290) applies the trained post-processing model to the foreground segment(s) but not the background segment(s) responsive to a decision that the background segment(s) are in a static background or blurred background.

The other segment(s) of the decoded video for the unit of the video sequence can be post-processed without applying the trained post-processing model. For example, the post-processing engine (290) can upsample the other segment(s) to increase spatial resolution by the same upsampling factor as the trained post-processing model.

D. Example Architectures for Combined Implementation.

FIG. 2d shows an example architecture of a conferencing tool (200d) for adaptive post-processing of decoded video that depends on results of scenario detection, results of video quality analysis, and results of segmentation. The adaptive post-processing uses playback-side inference with a selected, trained post-processing model. The conferencing tool (200d) shown in FIG. 2d includes the components of the conferencing tools (200a, 200b, 200c) shown in FIGS. 2a-2c. In the conferencing tool (200d), the resource analyzer (220), streaming controller (225), video decoder (230), scenario detector (240), video quality analyzer (250), segmentation analyzer (260), model selector (270), and post-processing engine (290) are configured to operate as described with reference to FIGS. 2a-2c. Interactions with the network (210) and database (280) occur as explained with reference to FIG. 2a. Alternatively, a server computing device can provide results of scenario detection, segmentation, and/or video quality analysis to the conferencing tool (200d), as described above.

E. Example Architectures for Alternative Implementations.

Figure 2E:
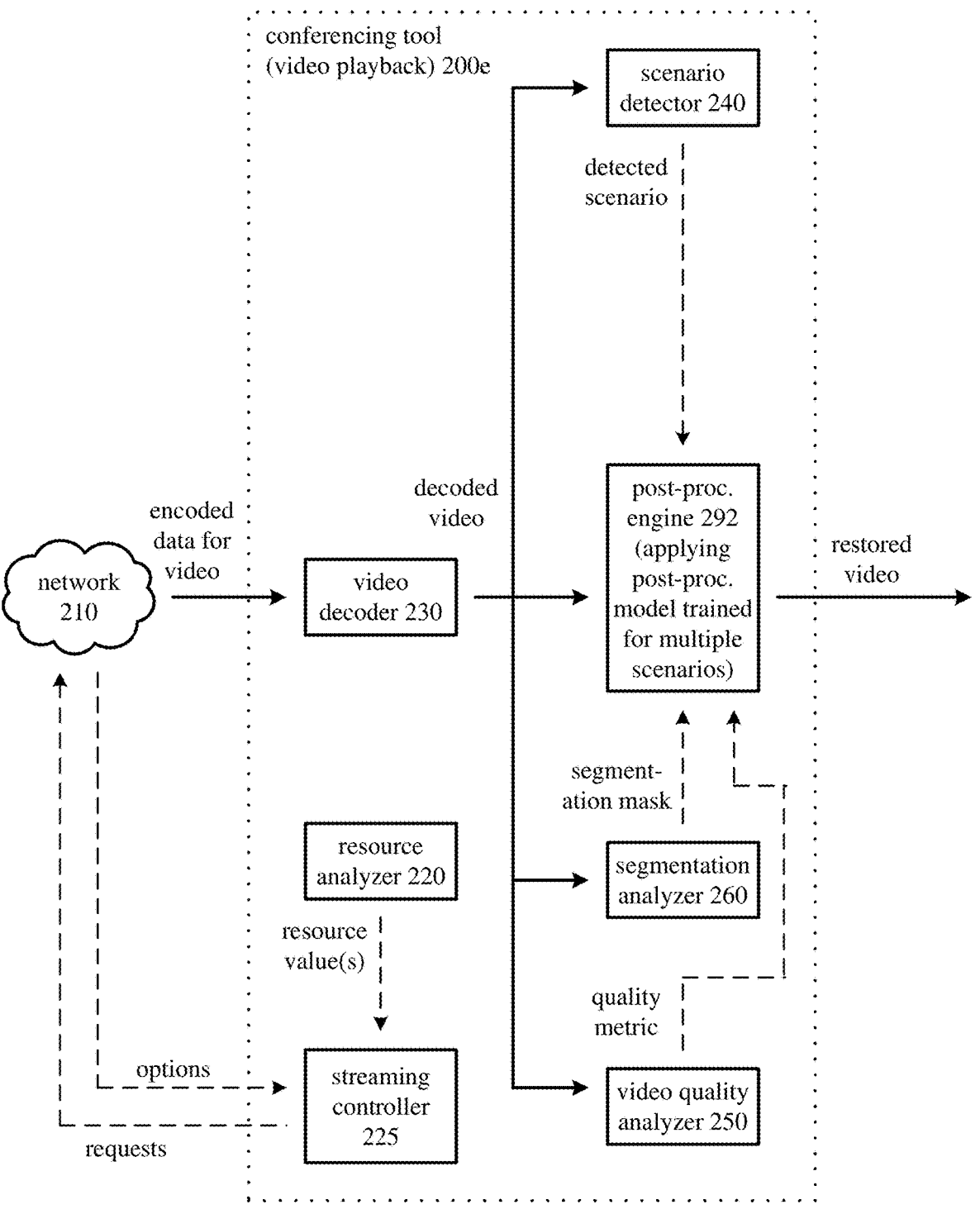

FIG. 2e shows an example architecture of a conferencing tool (200e) for adaptive post-processing of decoded video that depends on results of scenario detection, results of video quality analysis, and results of segmentation. The conferencing tool (200e) shown in FIG. 2e includes some of the components of the conferencing tools (200a, 200b, 200c) shown in FIGS. 2a-2c. In the conferencing tool (200e), the resource analyzer (220), streaming controller (225), video decoder (230), scenario detector (240), video quality analyzer (250), and segmentation analyzer (260) are configured to operate as described with reference to FIGS. 2a-2c. Interactions with the network (210) occur as explained with reference to FIG. 2a. Alternatively, a server computing device can provide results of scenario detection, segmentation, and/or video quality analysis to the conferencing tool (200e), as described above.

Unlike the conferencing tools (200a, 200b, 200c, 200d) shown in FIGS. 2a-2d, the conferencing tool (200e) shown in FIG. 2e does not include a model selector configured to select one of multiple scenario-specific trained post-processing models. Instead, the post-processing engine (292) of the conferencing tool (200e) is configured to apply a post-processing model that has been trained for multiple scenarios. The post-processing engine (292) can be configured to accept, as input, an indication of a detected scenario, which the post-processing engine can use to guide post-processing operations on decoded video.

III. Example Techniques for Selectively Applying a Post-Processing Model in a Combined Implementation.

FIGS. 3a and 3b show an example technique (300) for selectively applying a post-processing model for video in a combined implementation. A conferencing tool implemented in a client computing device, as described with reference to FIG. 2d or otherwise, can perform the technique (300).

To start, the conferencing tool analyzes (310) resources of the client computing device that implements the conferencing tool. For example, the conferencing tool receives one or more indicators of resources of the client computing device in which the conferencing tool is implemented. The resources can include a default spatial resolution (e.g., of a screen for display), available network bandwidth, available processing resources for post-processing, and/or other types of resources.

The conferencing tool determines (320) whether or not to assess one or more target characteristics of video to request (such as a target spatial resolution or target quality). The conferencing tool can make this determination before receiving and decoding any decoded data. The conferencing tool can also reassess target characteristic(s) of video to request from time-to-time during conferencing.

When the target characteristics are assessed (or reassessed), the conferencing tool determines (322) target characteristic(s) of video to request based at least in part on the indicator(s) of resource(s) and/or results of video quality analysis. For example, as part of bitrate negotiation before or during conferencing, based on the available network bandwidth being below a bandwidth threshold, the conferencing tool determines a target spatial resolution lower than the default spatial resolution or determines a target quality lower than a default quality. Or, as another example, as part of bitrate negotiation before or during conferencing, based on the available processing resources for post-processing being above a processing resources threshold, the conferencing tool determines a target spatial resolution lower than the default spatial resolution or determines a target quality lower than a default quality. Or, as another example, based on results of video quality analysis being below a video quality threshold, the conferencing tool determines a target spatial resolution lower than the default spatial resolution or determines a target quality lower than a default quality.

For at least some of the video sequence, the conferencing tool requests (330) encoded data having the target characteristic(s). For example, the conferencing tool requests encoded data from a video conferencing service or encoder-side controller.

The conferencing tool receives (332) encoded data in a bitstream for a current unit of a video sequence. For example, the current unit of the video sequence is a frame, a slice, or a tile. Alternatively, the current unit of the video sequence is a group of pictures or another unit of video. The conferencing tool decodes (334) the encoded data, thereby producing decoded video for the current unit of the video sequence.

The conferencing tool then determines (340) whether or not to analyze video quality of the decoded video for the current unit of the video sequence. The conferencing tool can analyze video quality for every frame of the video sequence, periodically analyze video quality for every $n^{th}$ frame (for a value of n such as 5, 15, or 150), or analyze video quality on some other basis.

In some cases ("yes" branch from decision 340), responsive to determining to analyze video quality, the conferencing tool performs (342) video quality analysis on the decoded video for the current unit of the video sequence. For example, the video quality analysis uses an ML model with an LSTM network. Alternatively, the video quality analysis uses a different approach. The results of video quality analysis can be used when determining target characteristic(s) of video to request for subsequent units of the video sequence.

The conferencing tool checks (350) whether or not to consider segmentation information in post-processing. If so ("yes" branch from decision 350), the conferencing tool determines (352) segmentation information for the decoded video for the current unit of the video sequence. The segmentation information indicates one or more foreground segments of the decoded video for the current unit of the video sequence. For example, the conferencing tool determines the segmentation information using an ML model having a convolutional U-net architecture. Alternatively, the conferencing tool determines the segmentation information using metadata in the bitstream. Alternatively, the conferencing tool determines the segmentation information in some other way.

In some example implementations, the segmentation information is a segmentation mask. The segmentation mask indicates, for a given pixel location of the decoded video for the current unit of the video sequence, whether the given pixel location is in a foreground segment or other segment. Alternatively, the segmentation information indicates, for a given pixel location of the decoded video for the current unit of the video sequence, one of multiple layers of the decoded video for the current unit of the video sequence. The multiple layers include a foreground layer with the foreground segment(s). Alternatively, the segmentation information is organized in some other way.

The conferencing tool determines (360) whether or not to perform post-processing based on various criteria. In particular, the conferencing tool can determine whether or not to perform post-processing based at least in part on results of video quality analysis. For example, when the conferencing tool performs (342) video quality analysis on the decoded video for the current unit of the video sequence, the conferencing tool determines (360) whether or not to perform post-processing based at least in part on results of the video quality analysis on the decoded video for the current unit of the video sequence. The conferencing tool can compare results of the video quality analysis on the decoded video for the current unit of the video sequence to a video quality threshold. Alternatively, when the conferencing tool skips video quality analysis on the decoded video for the current unit of the video sequence, the conferencing tool determines (360) whether or not to perform post-processing based at least in part on results of the video quality analysis on the decoded video for a previous unit of the video sequence (e.g., comparing results of the video quality analysis on the decoded video for the previous unit of the video sequence to a video quality threshold).

Or, as another example, to determine (360) whether or not to perform post-processing, the conferencing tool checks the results of the video quality analysis on the decoded video for the previous unit of the video sequence, as reflected in the target characteristic(s). If the target characteristic(s) of video (such as a target spatial resolution or target quality) are lower than default settings, the conferencing tool determines to perform post-processing. On the other hand, if the target characteristic(s) of video are the default settings, the conferencing tool determines to skip post-processing.

In some cases ("yes" branch from decision 360), responsive to determining to perform post-processing, the conferencing tool checks (370) whether to evaluate (or reevaluate) the scenario in the decoded video for the current unit of the video sequence. The conferencing tool can perform scenario evaluation for every frame of the video sequence, in which case the conferencing tool checks whether a new frame has been decoded. Alternatively, the conferencing tool can perform scenario evaluation for every new scene of the video sequence, in which case the conferencing tool checks whether a new scene has started in the decoded video. Scene detection can use, for example, an ML model configured to detect new scenes in decoded video.

If the conferencing tool decides to evaluate a scenario in the decoded video for the current unit of the video sequence, with a scenario detection model, the conferencing tool detects (372) a scenario in the decoded video for the current unit of the video sequence. For example, the scenario detection model uses a face detection model and a count of faces in the decoded video, as described with reference to FIG. 2a. Or, as another example, the scenario detection model is an ML model. The ML model is configured to accept, as input, sample values of the decoded video for the current unit of the video sequence. The ML model is configured to produce, as output, an indication of the detected scenario. The ML model can also be configured to accept, as input, metadata from the bitstream that indicates one or more content characteristics of the current unit of the video sequence. Examples of scenario detection models are described with reference to FIG. 2a. Alternatively, the conferencing tool uses a different type of scenario detection model.

Based on the detected scenario, the conferencing tool selects (374) between multiple trained post-processing models. Each of the multiple trained post-processing models has been trained to perform post-processing operations for a different scenario selected from among multiple scenarios, for example, as explained with reference to FIG. 1. The multiple scenarios can include talking head video, conference room video, slideshow presentation video, and screen capture content video. Alternatively, the multiple scenarios can include other and/or additional scenarios. Examples of trained post-processing models are described with reference to FIG. 2a.

In general, each of the multiple trained post-processing models is a given type of ML model. The given type of machine learning can be the same for all of the multiple trained post-processing models. Alternatively, the given type of machine learning is different for at least some of the multiple trained post-processing models.

When post-processing is used ("yes" branch from decision 360), the conferencing tool applies (380) a trained post-processing model to at least some of decoded video for the video sequence. For example, the conferencing tool applies (380) the selected, trained post-processing model to the decoded video for the current unit of the video sequence and/or one or more subsequent units of the video sequence. (If scenario detection is skipped in the current iteration, the selected post-processing model is the model previously selected based on the scenario detected in a previous iteration.)

When segmentation is used, the conferencing tool can apply the trained post-processing model to the foreground segment(s) of the decoded video for the current unit of the video sequence but not to one or more other segments (e.g., background segments) of the decoded video for the current unit of the video sequence. The conferencing tool can conditionally apply the trained post-processing model to the foreground segment(s) but not background segment(s) of the decoded video for the current unit of the video sequence. For example, the conferencing tool determines whether or not the background segment(s) are in a static background or blurred background. The conferencing tool applies the trained post-processing model to the foreground segment(s), but not the background segment(s), responsive to a decision that the background segment(s) are in a static background or blurred background.

When segmentation is used, the other segment(s) of the decoded video for the current unit of the video sequence can be post-processed without applying the trained post-processing model. For example, when an SR/VR model is applied to the foreground segment(s), the other segment(s) can be upsampled without using the trained post-processing model to increase spatial resolution by the same factor. The upsampling can use bilinear interpolation or another type of interpolation.

In some example implementations, the trained post-processing model is configured to perform post-processing of video for a given video codec, a given profile for the given video codec, and a range of spatial resolutions. Alternatively, a post-processing model can be configured to perform post-processing of video for multiple video codecs and/or for multiple profiles for a given video codec.

The trained post-processing model can be an SR/VR model, VR model, or another type of post-processing model. An SR/VR model is an ML model configured to increase spatial resolution, mitigate compression artifacts, and mitigate upsampling artifacts introduced when increasing spatial resolution. For an SR/VR model, spatial resolution increases between input to and output from the model. An SR/VR model is configured for a given upsampling factor such as 1:2 or 1:4. A VR model is an ML model configured to mitigate compression artifacts. For a VR model, spatial resolution is unchanged between input to and output from the model.

After post-processing, the conferencing tool renders (390) video for display and outputs results of the rendering the video for display. The rendered video can include the results of applying the trained post-processing model to the at least some of the decoded video for the video sequence. Or, if post-processing is skipped, rendered video can simply include the decoded video. The rendering process can include operations such as color space conversion operations, color mapping operations, scaling operations, or filtering operations. If a decoded unit is a sub-frame unit, the restored unit may be stored until a frame is complete, at which point the rendering and outputting may be performed for the frame. Also, depending on differences between decoding order of frames and display order of frames, the rendering and outputting may be performed after storing a restored frame for a period of time in a decoded picture buffer.

The conferencing tool checks (392) whether to continue in another iteration. If so, the conferencing tool continues processing for a subsequent unit of the video sequence in a next iteration, starting from the decision (320) whether to assess (or reassess) target characteristic(s) of video to request.

In FIGS. 3a and 3b, operations for decoding (334) and applying (380) a trained post-processing model are performed serially for a given unit of video. Alternatively, the conferencing tool can perform certain operations in parallel for different units. For example, at least some operations for the decoding (334), applying (380) the trained post-processing model, and rendering (390) can be performed in parallel for different units of video.

IV. Example Techniques for Selectively Applying a Post-Processing Model for Video Depending on Results of Scenario Detection.

FIG. 4 shows an example technique (400) for selectively applying a post-processing model for video depending on results of scenario detection. A conferencing tool implemented in a client computing device, as described with reference to one of FIGS. 2a-2d or otherwise, can perform the technique (400).

To start, the conferencing tool receives (410) encoded data in a bitstream for a current unit of a video sequence. For example, the current unit of the video sequence is a frame, a slice, or a tile. Alternatively, the current unit of the video sequence is a group of pictures or another unit of video. The conferencing tool decodes (420) the encoded data, thereby producing decoded video for the current unit of the video sequence.

The conferencing tool checks (430) whether to evaluate (or reevaluate) the scenario in the decoded video for the current unit of the video sequence, using results of scenario detection determined by the conferencing tool or received by the conferencing tool. The conferencing tool can perform scenario evaluation for every frame of the video sequence, in which case the conferencing tool checks whether a new frame has been decoded. Alternatively, the conferencing tool can perform scenario evaluation for every new scene of the video sequence, in which case the conferencing tool checks whether a new scene has started in the decoded video. Scene detection can use, for example, an ML model configured to detect new scenes in decoded video.

If the conferencing tool decides to evaluate a scenario in the decoded video for the current unit of the video sequence, based on results of detecting a scenario with a scenario detection model (which can be determined at the client computing device or received from a server computing device), the conferencing tool selects (434) between multiple trained post-processing models. Each of the multiple trained post-processing models has been trained to perform post-processing operations for a different scenario selected from among multiple scenarios, for example, as explained with reference to FIG. 1. The multiple scenarios can include talking head video, conference room video, slideshow presentation video, and screen capture content video. Alternatively, the multiple scenarios can include other and/or additional scenarios. Examples of trained post-processing models are described with reference to FIG. 2a.

For example, with the scenario detection model, the conferencing tool detects (432) the scenario in the decoded video for the current unit of the video sequence, thereby producing the results of the detecting the scenario with the scenario detection model. Alternatively, the conferencing tool receives, from a server computing device, the results of the detecting the scenario with the scenario detection model. The scenario detection model can use a face detection model and a count of faces in the decoded video, as described with reference to FIG. 2a. Or, as another example, the scenario detection model can be an ML model. The ML model is configured to accept, as input, sample values of the decoded video for the current unit of the video sequence. The ML model is configured to produce, as output, an indication of the detected scenario. The ML model can also be configured to accept, as input, metadata from the bitstream that indicates one or more content characteristics of the current unit of the video sequence. Examples of scenario detection models are described with reference to FIG. 2a. Alternatively, the conferencing tool uses a different type of scenario detection model.

In general, each of the multiple trained post-processing models is a given type of ML model. The given type of machine learning can be the same for all of the multiple trained post-processing models. Alternatively, the given type of machine learning is different for at least some of the multiple trained post-processing models.

In some example implementations, each of the multiple trained post-processing models is configured to perform post-processing of video for a given video codec, a given profile for the given video codec, and a range of spatial resolutions. Alternatively, a post-processing model can be configured to perform post-processing of video for multiple video codecs and/or for multiple profiles for a given video codec.

The trained post-processing models can be SR/VR models, VR models, or another type of post-processing model. An SR/VR model is an ML model configured to increase spatial resolution, mitigate compression artifacts, and mitigate upsampling artifacts introduced when increasing spatial resolution. For an SR/VR model, spatial resolution increases between input to and output from the model. A VR model is an ML model configured to mitigate compression artifacts. For a VR model, spatial resolution is unchanged between input to and output from the model.

The conferencing tool applies (440) the selected, trained post-processing model to at least some of decoded video for the video sequence. For example, the conferencing tool applies (440) the selected, trained post-processing model to the decoded video for the current unit of the video sequence and/or one or more subsequent units of the video sequence. (If scenario detection is skipped in the current iteration, the selected post-processing model is the model previously selected based on the scenario detected in a previous iteration.)

After post-processing, the conferencing tool can render video for display and output results of the rendering the video for display, as explained with reference to the example technique (300) of FIG. 3.

The conferencing tool checks (460) whether to continue in another iteration. If so, the conferencing tool continues processing for a subsequent unit of the video sequence in a next iteration. In this way, for each of multiple subsequent units of the video sequence, the conferencing tool can receive (410) encoded data in the bitstream for the subsequent unit of the video sequence, decode (420) the encoded data for the subsequent unit of the video sequence, thereby producing decoded video for the subsequent unit of the video sequence, and determine (430) whether or not to perform scenario evaluation. Responsive to a decision not to perform scenario evaluation ("no" branch from decision 430), the conferencing tool can apply (440) the previously selected, trained post-processing model to at least some of the decoded video for the subsequent unit of the video sequence. On the other hand, responsive to a decision to perform scenario evaluation ("yes" branch from decision

430), the conferencing tool can, with the scenario detection model, detect (432) a scenario in the decoded video for the subsequent unit of the video sequence (or receive results of scenario detection from a server computing device), based on the results, select (434) between the multiple trained post-processing models, and apply (440) the newly selected, trained post-processing model to at least some of the decoded video for the subsequent unit of the video sequence.

Before receiving and decoding any encoded data, or from time to time during conferencing, the conferencing tool can perform various operations to determine target characteristics of video to request, as described with reference to the example technique (300) of FIG. 3. For at least some of the video sequence, the conferencing tool requests encoded data having the target characteristic(s).

The technique (400) shown in FIG. 4 can be performed in combination with the technique (500) shown in FIG. 5 and/or the technique (600) shown in FIG. 6.

In FIG. 4, operations for decoding (420) and applying (440) a trained post-processing model are performed serially for a given unit of video. Alternatively, the conferencing tool can perform certain operations in parallel for different units. For example, at least some operations for the decoding (420) and applying (440) the trained post-processing model can be performed in parallel for different units of video.

The following table shows some of the innovative features described herein for adaptive post-processing in a conferencing tool using scenario detection.

| | Feature |
|---|---|
| A1 | In a client computing device that implements a conferencing tool, a method comprising:<br>receiving encoded data in a bitstream for a current unit of a video sequence;<br>decoding the encoded data, thereby producing decoded video for the current unit of the video sequence;<br>based on results of detecting a scenario with a scenario detection model, selecting between multiple trained post-processing models; and applying the selected, trained post-processing model to at least some decoded video for the video sequence. |
| A2 | The method of A1, further comprising:<br>with the scenario detection model, detecting the scenario in the decoded video for the current unit of the video sequence, thereby producing the results of the detecting the scenario with the scenario detection model. |
| A3 | The method of A1, further comprising:<br>receiving, from a server computing device, the results of the detecting the scenario with the scenario detection model. |
| A4 | The method of A1, wherein the scenario detection model uses a face detection model and a count of faces in the decoded video. |
| A5 | The method of A1, wherein the scenario detection model is a machine learning model configured to accept, as input, sample values of the decoded video for the current unit of the video sequence and configured to produce, as output, an indication of the detected scenario. |
| A6 | The method of A5, wherein the scenario detection model is further configured to accept, as input, metadata from the bitstream that indicates one or more content characteristics of the current unit of the video sequence. |
| A7 | The method of any one of A1 to A6, wherein each of the multiple trained post-processing models is a super-resolution/video restoration model configured to increase spatial resolution, mitigate compression artifacts, and mitigate upsampling artifacts, and wherein spatial resolution increases between input to and output from the selected, trained post-processing model. |
| A8 | The method of A7, wherein each of the multiple trained post-processing models is configured for a given upsampling factor. |
| A9 | The method of any one of A1 to A6, wherein each of the multiple trained post-processing models is a video restoration model configured to mitigate compression artifacts, and wherein spatial resolution is unchanged between input to and output from the selected, trained post-processing model. |
| A10 | The method of any one of A1 to A9, wherein each of the multiple trained post-processing models has been trained to perform post-processing operations for a different scenario selected from among multiple scenarios, and wherein the multiple scenarios include talking head video, conference room video, slideshow presentation video, and screen capture content video. |

-continued

| | Feature |
|---|---|
| A11 | The method of any one of A1 to A10, wherein each of the multiple trained post-processing models is a given type of machine learning model, and wherein: the given type of machine learning is the same for all of the multiple trained post-processing models; or the given type of machine learning is different for at least some of the multiple trained post-processing models. |
| A12 | The method of any one of A1 to A11, wherein each of the multiple trained post-processing models is configured to perform post-processing of video for a given video codec, a given profile for the given video codec, and a range of spatial resolutions. |
| A13 | The method of any one of A1 to A12, further comprising, for each of multiple subsequent units of the video sequence: receiving encoded data in the bitstream for the subsequent unit of the video sequence; decoding the encoded data for the subsequent unit, thereby producing decoded video for the subsequent unit of the video sequence; determining whether or not to perform scenario evaluation; and responsive to a decision not to perform scenario evaluation, applying the previously selected, trained post-processing model to at least some of the decoded video for the subsequent unit of the video sequence; or otherwise, responsive to a decision to perform scenario evaluation: with the scenario detection model, detecting a scenario in the decoded video for the subsequent unit of the video sequence; based on the detected scenario in the decoded video for the subsequent unit of the video sequence, selecting between the multiple trained post-processing models; and applying the newly selected, trained post-processing model to at least some of the decoded video for the subsequent unit of the video sequence. |
| A14 | The method of A13, wherein scenario evaluation is: performed for every frame of the video sequence; or performed for every new scene of the video sequence. |
| A15 | The method of any one of A1 to A14, wherein the current unit of the video sequence is a slice or frame. |
| A16 | The method of any one of A1 to A15, further comprising, as part of bitrate negotiation before or during conferencing: receiving one or more indicators of resources of the client computing device, the resources including a default spatial resolution, available network bandwidth, and/or available processing resources for post-processing; determining one or more target characteristics of video based at least in part on the one or more indicators; and requesting, for at least some of the video sequence, encoded data having the one or more target characteristics. |
| A17 | The method of A16, wherein the determining the one or more target characteristics includes, based on the available network bandwidth being below a bandwidth threshold and/or the available processing resources for post-processing being above a processing resources threshold: determining a target spatial resolution lower than the default spatial resolution; or determining a target quality lower than a default quality. |
| A18 | The method of any one of A1 to A17, further comprising: rendering video for display, the rendered video including results of the applying the selected, trained post-processing model to the at least some of the decoded video for the video sequence. |
| A19 | The method of any one of A1 to A18, further comprising: performing video quality analysis; and based at least in part on results of the video quality analysis: adjusting one or more target characteristics of video; or determining whether or not to perform post-processing. |
| A20 | The method of any one of A1 to A19, further comprising: determining segmentation information for the decoded video for the current unit of the video sequence, the segmentation information indicating one or more foreground segments of the decoded video for the current unit of the video sequence, wherein the selected, trained post-processing model is applied to the one or more foreground segments of the decoded video for the current unit of the video sequence but not applied to one or more other segments of the decoded video for the current unit of the video sequence. |
| A21 | A client computing device comprising a processor system and memory, wherein the client computing device is configured to perform operations for the method of any one of A1-A20. |
| A22 | One or more computer-readable media having stored therein computer-executable instructions for causing a processor system, when programmed thereby, to perform operations for the method of any one of A1-A20. |

V. Example Techniques for Selectively Applying a Post-Processing Model for Video Depending on Results of Segmentation.

FIG. 5 shows an example technique (500) for selectively applying a post-processing model for video depending on results of segmentation. A conferencing tool implemented in a client computing device, as described with reference to FIG. 2c, FIG. 2d, FIG. 2e, or otherwise, can perform the technique (500).

To start, the conferencing tool receives (510) encoded data in a bitstream for a current unit of a video sequence. For example, the current unit of the video sequence is a frame, a slice, or a tile. Alternatively, the current unit of the video sequence is a group of pictures or another unit of video. The conferencing tool decodes (520) the encoded data, thereby producing decoded video for the current unit of the video sequence.

The conferencing tool obtains (530) segmentation information for the decoded video for the current unit of the video sequence. The segmentation information indicates one or more foreground segments of the decoded video for the current unit of the video sequence. For example, the conferencing tool determines the segmentation information or, alternatively, receives the segmentation information from a server computing device. The segmentation information can be determined (by the conferencing tool or otherwise) using an ML model having a convolutional U-net architecture. Alternatively, the segmentation information can be determined (by the conferencing tool or otherwise) using metadata in the bitstream. Alternatively, the segmentation information can be determined (by the conferencing tool or otherwise) in some other way.

In some example implementations, the segmentation information is a segmentation mask. The segmentation mask indicates, for a given pixel location of the decoded video for the current unit of the video sequence, whether the given pixel location is in a foreground segment or other segment. Alternatively, the segmentation information indicates, for a given pixel location of the decoded video for the current unit of the video sequence, one of multiple layers of the decoded video for the current unit of the video sequence. The multiple layers include a foreground layer with the foreground segment(s). Alternatively, the segmentation information is organized in some other way.

The conferencing tool applies (540) a trained post-processing model to the foreground segment(s) of the decoded video for the current unit of the video sequence but not to one or more other segments (e.g., background segments) of the decoded video for the current unit of the video sequence.

The conferencing tool can conditionally apply the trained post-processing model to the foreground segment(s) but not background segment(s) of the decoded video for the current unit of the video sequence. For example, the conferencing tool determines whether or not the background segment(s) are in a static background or blurred background. The conferencing tool applies the trained post-processing model to the foreground segment(s) but not the background segment(s) responsive to a decision that the background segment(s) are in a static background or blurred background.

In some example implementations, the trained post-processing model is configured to perform post-processing of video for a given video codec, a given profile for the given video codec, and a range of spatial resolutions. Alternatively, a post-processing model can be configured to perform post-processing of video for multiple video codecs and/or for multiple profiles for a given video codec.

The trained post-processing model can be an SR/VR model, VR model, or another type of post-processing model. An SR/VR model is an ML model configured to increase spatial resolution, mitigate compression artifacts, and mitigate upsampling artifacts introduced when increasing spatial resolution. For an SR/VR model, spatial resolution increases between input to and output from the model. A VR model is an ML model configured to mitigate compression artifacts. For a VR model, spatial resolution is unchanged between input to and output from the model.

The other segment(s) of the decoded video for the current unit of the video sequence can be post-processed without applying the trained post-processing model. For example, when an SR/VR model is applied to the foreground segment(s), the other segment(s) can be upsampled without using the trained post-processing model to increase spatial resolution by the same factor. The upsampling can use bilinear interpolation or another type of interpolation.

After post-processing, the conferencing tool can render video for display and output results of the rendering the video for display, as explained with reference to the example technique (300) of FIG. 3. When segmentation information is used, the rendered video can include the results of applying the trained post-processing model to the foreground segment(s) of the decoded video for the current unit of the video sequence.

The conferencing tool checks (560) whether to continue in another iteration. If so, the conferencing tool continues processing for a subsequent unit of the video sequence in a next iteration. In this way, for each of multiple subsequent units of the video sequence, the conferencing tool can receive (510) encoded data in the bitstream for the subsequent unit of the video sequence, decode (520) the encoded data for the subsequent unit of the video sequence, thereby producing decoded video for the subsequent unit of the video sequence, determine (530) segmentation information for the decoded video for the current unit of the video sequence, and apply the trained post-processing model to foreground segment(s) but not other segment(s) of the decoded video for the subsequent unit of the video sequence.

Before receiving and decoding any encoded data, or from time to time during conferencing, the conferencing tool can perform various operations to determine target characteristics of video to request, as described with reference to the example technique (300) of FIG. 3. For at least some of the video sequence, the conferencing tool requests encoded data having the target characteristic(s).

The technique (500) shown in FIG. 5 can be performed in combination with the technique (400) shown in FIG. 4 and/or the technique (600) shown in FIG. 6.

In FIG. 5, operations for decoding (520) and applying (540) a trained post-processing model are performed serially for a given unit of video. Alternatively, the conferencing tool can perform certain operations in parallel for different units. For example, at least some operations for the decoding (520) and applying (540) the trained post-processing model can be performed in parallel for different units of video.

The following table shows some of the innovative features described herein for adaptive post-processing in a conferencing tool using segmentation.

| | Feature |
|---|---|
| B1 | In a client computing device that implements a conferencing tool, a method comprising: <br> receiving encoded data in a bitstream for a current unit of a video sequence; <br> decoding the encoded data, thereby producing decoded video for the current unit of the video sequence; <br> obtaining segmentation information for the decoded video for the current unit of the video sequence, the segmentation information indicating one or more foreground segments of the decoded video for the current unit of the video sequence; and <br> applying a trained post-processing model to the one or more foreground segments of the decoded video for the current unit of the video sequence but not to one or more other segments of the decoded video for the current unit of the video sequence. |
| B2 | The method of B1, wherein the obtaining the segmentation information includes determining the segmentation information. |
| B3 | The method of B2, wherein the determining the segmentation information uses a machine learning model having a convolutional U-net architecture. |
| B4 | The method of B2, wherein the determining the segmentation information uses metadata in the bitstream. |
| B5 | The method of B1, wherein the obtaining the segmentation information includes receiving, from a server computing device, the segmentation information. |
| B6 | The method of any one of B1 to B5, wherein the segmentation information is a segmentation mask indicating, for a given pixel location of the decoded video for the current unit of the video sequence, whether the given pixel location is in a foreground segment or other segment. |
| B7 | The method of any one of B1 to B5, wherein the segmentation information indicates, for a given pixel location of the decoded video for the current unit of the video sequence, one of multiple layers of the decoded video for the current unit of the video sequence, the multiple layers including a foreground layer with the one or more foreground segments. |
| B8 | The method of any one of B1 to B7, wherein the one or more other segments include one or more background segments, the method further comprising: <br> determining whether or not the one or more background segments are in a static background, wherein the applying the trained post-processing model to the one or more foreground segments but not the one or more background segments is performed responsive to a decision that the one or more background segments are in a static background. |
| B9 | The method of any one of B1 to B7, wherein the one or more other segments include one or more background segments, the method further comprising: <br> determining whether or not the one or more background segments are in a blurred background, wherein the applying the trained post-processing model to the one or more foreground segments but not to the one or more background segments is performed responsive to a decision that the one or more background segments are in a blurred background. |
| B10 | The method of any one of B1 to B9, further comprising: <br> upsampling the one or more other segments without using the trained post-processing model. |
| B11 | The method of B10, wherein the upsampling uses bilinear interpolation. |
| B12 | The method of any one of B1 to B11, wherein the current unit of the video sequence is a slice or frame. |
| B13 | The method of any one of B1 to B12, wherein the trained post-processing model is: <br> a super-resolution/video restoration model configured to increase spatial resolution, mitigate compression artifacts, and mitigate upsampling artifacts; or <br> a video restoration model configured to mitigate compression artifacts. |
| B14 | The method of any one of B1 to B13, wherein the trained post-processing model is configured to perform post-processing of video for a given video codec, a given profile for the given video codec, and a range of spatial resolutions. |
| B15 | The method of any one of B1 to B14, further comprising, for each of multiple subsequent units of the video sequence: <br> repeating the receiving, the decoding, the determining segmentation information, and the applying the trained post-processing model for the subsequent unit of the video sequence. |
| B16 | The method of any one of B1 to B15, further comprising, as part of bitrate negotiation before or during conferencing: <br> receiving one or more indicators of resources of the client computing device, the resources including a default spatial resolution, available network bandwidth, and/or available processing resources for post-processing; <br> determining one or more target characteristics of video based at least in part on the one or more indicators; and <br> requesting, for at least some of the video sequence, encoded data having the one or more target characteristics. |

-continued

| Feature |
| --- |

B17 The method of B16, wherein the determining the one or more target
   characteristics includes, based on the available network bandwidth being below a
   bandwidth threshold and/or the available processing resources for post-processing
   being above a processing resources threshold:
   determining a target spatial resolution lower than the default spatial
   resolution; or
   determining a target quality lower than a default quality.
B18 The method of any one of B1 to B17, further comprising:
   rendering video for display, the rendered video including results of the
   applying the trained post-processing model to the one or more foreground segments
   of the decoded video for the current unit of the video sequence.
B19 The method of any one of B1 to B18, further comprising:
   performing video quality analysis; and
   based at least in part on results of the video quality analysis:
   adjusting one or more target characteristics of video; or
   determining whether or not to perform post-processing.
B20 The method of any one of B1 to B19, further comprising:
   with a scenario detection model, detecting a scenario in the decoded video
   for the current unit of the video sequence; and
   based on the detected scenario, selecting between multiple trained post-
   processing models, wherein the selected, trained post-processing model is applied.
B21 A client computing device comprising a processor system and memory,
   wherein the client computing device is configured to perform operations for the
   method of any one of B1-B20.
B22 One or more computer-readable media having stored therein computer-
   executable instructions for causing a processor system, when programmed thereby,
   to perform operations for the method of any one of B1-B20.

VI. Example Techniques for Selectively Applying a Post-Processing Model for Video Depending on Results of Video Quality Analysis.

FIG. 6 shows an example technique (600) for selectively applying a post-processing model for video depending on results of video quality analysis. A conferencing tool implemented in a client computing device, as described with reference to FIG. 2b, FIG. 2d, FIG. 2e, or otherwise, can perform the technique (600).

The conferencing tool receives (630) encoded data in a bitstream for a current unit of a video sequence. For example, the current unit of the video sequence is a frame, a slice, or a tile. Alternatively, the current unit of the video sequence is a group of pictures or another unit of video. The conferencing tool decodes (640) the encoded data, thereby producing decoded video for the current unit of the video sequence.

In the technique (600) shown in FIG. 6, adaptive post-processing of decoded video depends on results of video quality analysis checked in a condition for post-processing. The conferencing tool determines (650) whether or not to check video quality of the decoded video for the current unit of the video sequence. The conferencing tool can check video quality for every frame of the video sequence, periodically check video quality for every $n^{th}$ frame (for a value of n such as 5, 15, or 150), or check video quality on some other basis.

In some cases ("yes" branch from decision 650), responsive to determining to check video quality, the conferencing tool can perform (652) video quality analysis on the decoded video for the current unit of the video sequence. For example, the video quality analysis uses an ML model with an LSTM network. Alternatively, the video quality analysis uses a different approach. The results of video quality analysis can also be used when determining one or more target characteristics of video to request (e.g., for subsequent units of the video sequence). Alternatively, the conferencing tool receives, from a server computing device, results of video quality analysis.

The conferencing tool determines (660) whether or not to perform post-processing based at least in part on results of video quality analysis (as determined or received by the conferencing tool). For example, when the conferencing tool performs (652) video quality analysis on the decoded video for the current unit of the video sequence, the conferencing tool determines (660) whether or not to perform post-processing based at least in part on results of the video quality analysis on the decoded video for the current unit of the video sequence. The conferencing tool can compare results of the video quality analysis on the decoded video for the current unit of the video sequence to a video quality threshold. Alternatively, when the conferencing tool skips video quality analysis on the decoded video for the current unit of the video sequence, the conferencing tool determines (660) whether or not to perform post-processing based at least in part on results of the video quality analysis on the decoded video for a previous unit of the video sequence (e.g., comparing results of the video quality analysis on the decoded video for the previous unit of the video sequence to a video quality threshold). Or, as another example, to determine whether or not to perform post-processing, the conferencing tool checks the results of the video quality analysis on the decoded video for the previous unit of the video sequence, as reflected in the target characteristic(s) of the video that was requested, which may have been set depending on results of video quality analysis for one or more previous units of a video sequence. If the target characteristic(s) of video (such as a target spatial resolution or target quality) are lower than default settings, the conferencing tool determines to perform post-processing. On the other hand, if the target characteristic(s) of video are the default settings, the conferencing tool determines to skip post-processing.

In some cases ("yes" branch from decision 660), responsive to determining to perform post-processing, the conferencing tool applies (670) a trained post-processing model to at least some of decoded video for the video sequence (e.g., decoded video for the current unit of the video sequence and/or one or more subsequent units of the video sequence).

In some example implementations, the trained post-processing model is configured to perform post-processing of video for a given video codec, a given profile for the given video codec, and a range of spatial resolutions. Alternatively, a post-processing model can be configured to perform post-processing of video for multiple video codecs and/or for multiple profiles for a given video codec.

In general, the trained post-processing model can be an SR/VR model, VR model, or another type of post-processing model. A SR/VR model is an ML model configured to increase spatial resolution, mitigate compression artifacts, and mitigate upsampling artifacts introduced when increasing spatial resolution. For an SR/VR model, spatial resolution increases between input to and output from the model. A VR model is an ML model configured to mitigate compression artifacts. For a VR model, spatial resolution is unchanged between input to and output from the model.

After post-processing, the conferencing tool can render video for display and output results of the rendering the video for display, as explained with reference to the example technique (300) of FIG. 3.

The conferencing tool checks (690) whether to continue in another iteration. If so, the conferencing tool continues processing for a subsequent unit of the video sequence in a next iteration. In this way, for each of multiple subsequent units of the video sequence, the conferencing tool can receive (630) encoded data in a bitstream for the subsequent unit of the video sequence, decode (640) the encoded data, thereby producing decoded video for the subsequent unit of the video sequence, and determine (660) whether or not to perform post-processing based at least in part on results of video quality analysis. Responsive to determining to perform post-processing, the conferencing tool can apply (670) the trained post-processing model to at least some of decoded video for the video sequence.

Before receiving and decoding any encoded data, or from time-to-time during conferencing, the conferencing tool can assess one or more target characteristics of video to request, as described with reference to the example technique (300) of FIG. 3. When target characteristic(s) are reassessed, the conferencing tool can consider results of video quality analysis on decoded video. For at least some of the video sequence, the conferencing tool requests encoded data having the target characteristic(s).

The technique (600) shown in FIG. 6 can be performed in combination with the technique (400) shown in FIG. 4 and/or the technique (500) shown in FIG. 5.

In FIG. 6, operations for decoding (640) and applying (670) a trained post-processing model are performed serially for a given unit of video. Alternatively, the conferencing tool can perform certain operations in parallel for different units. For example, at least some operations for the decoding (640) and applying (670) the trained post-processing model can be performed in parallel for different units of video.

The following table shows some of the innovative features described herein for adaptive post-processing in a conferencing tool using video quality analysis.

| | Feature |
|---|---|
| C1 | In a client computing device that implements a conferencing tool, a method comprising: receiving encoded data in a bitstream for a current unit of a video sequence; decoding the encoded data, thereby producing decoded video for the current unit of the video sequence; determining whether or not to perform post-processing based at least in part on results of video quality analysis; and responsive to determining to perform post-processing, applying a trained post-processing model to at least some of decoded video for the video sequence. |
| C2 | The method of C1, wherein the video quality analysis uses a machine learning model with a long short-term memory ("LSTM") network. |
| C3 | The method of C1 or C2, further comprising: determining whether or not to analyze video quality; and responsive to determining to analyze video quality, performing the video quality analysis on the decoded video for the current unit of the video sequence. |
| C4 | The method of C3, wherein the determining whether or not to perform post-processing depends on results of the video quality analysis on the decoded video for the current unit of the video sequence. |
| C5 | The method of C4, wherein the determining whether or not to perform post-processing includes comparing the results of the video quality analysis on the decoded video for the current unit of the video sequence to a video quality threshold. |
| C6 | The method of C4, wherein the trained post-processing model is a video restoration model configured to mitigate compression artifacts. |
| C7 | The method of C1 or C2, further comprising: receiving, from a server computing device, the results of the video quality analysis. |
| C8 | The method of C1 or C2, wherein the determining whether or not to perform post-processing depends on results of the video quality analysis on the decoded video for a previous unit of the video sequence. |
| C9 | The method of C8, wherein the determining whether or not to perform post-processing includes comparing the results of the video quality analysis on the decoded video for the previous unit of the video sequence to a video quality threshold. |
| C10 | The method of C8, wherein the trained post-processing model is: a super-resolution/video restoration model configured to increase spatial resolution, mitigate compression artifacts, and mitigate upsampling artifacts; or a video restoration model configured to mitigate compression artifacts. |
| C11 | The method of C8, wherein one or more target characteristics of video to request depend on the results of the video quality analysis on the decoded video for the previous unit of the video sequence. |

-continued

| Feature |
|---|

C12    The method of C11, further comprising, as part of bitrate negotiation before or during conferencing:
       receiving one or more indicators of resources of the client computing device, the resources including a default spatial resolution, available network bandwidth, and/or available processing resources for post-processing, wherein the one or more target characteristics are also based at least in part on the one or more indicators.

C13    The method of C12, further comprising, as part of the bitrate negotiation before or during conferencing:
       determining the one or more target characteristics, including, based on the available network bandwidth being below a bandwidth threshold, the available processing resources for post-processing being above a processing resources threshold, and/or the results of video quality analysis on the decoded video for the previous unit of the video sequence being below a video quality threshold:
       determining a target spatial resolution lower than the default spatial resolution; or
       determining a target quality lower than a default quality.

C14    The method of any one of C1 to C13, wherein the current unit of the video sequence is a slice or frame.

C15    The method of any one of C1 to C14, wherein the trained post-processing model is configured to perform post-processing of video for a given video codec, a given profile for the given video codec, and a range of spatial resolutions.

C16    The method of any one of C1 to C15, further comprising, for each of multiple subsequent units of the video sequence:
       repeating the receiving, the decoding, the determining, and the applying the trained post-processing model for the subsequent unit of the video sequence.

C17    The method of any one of C1 to C16, further comprising:
       rendering video for display, the rendered video including results of the applying the trained post-processing model to the at least some of the decoded video for the video sequence.

C18    The method of any one of C1 to C17, further comprising:
       determining segmentation information for the decoded video for the current unit of the video sequence, the segmentation information indicating one or more foreground segments of the decoded video for the current unit of the video sequence, wherein the trained post-processing model is applied to the one or more foreground segments of the decoded video for the current unit of the video sequence but not applied to one or more other segments of the decoded video for the current unit of the video sequence.

C19    The method of any one of C1 to C18, further comprising:
       with a scenario detection model, detecting a scenario in the decoded video for the current unit of the video sequence; and
       based on the detected scenario, selecting between multiple trained post-processing models, wherein the selected, trained post-processing model is applied.

C20    A client computing device comprising a processor system and memory, wherein the client computing device is configured to perform operations for the method of any one of C1-C19.

C21    One or more computer-readable media having stored therein computer-executable instructions for causing a processor system, when programmed thereby, to perform operations for the method of any one of C1-C19.

VII. Technical Benefits.

Using an ML model for post-processing of decoded video in a conferencing tool can provide various technical benefits. In general, with innovations described herein, a conferencing tool can in effect provide video at higher quality without significantly increasing the network bandwidth consumed by the video or, alternatively, provide video using less network bandwidth without significantly hurting the quality of the video.

For example, as part of bitrate negotiation before or during conferencing, a conferencing tool can request video at a lower spatial resolution (and hence lower bitrate) then, after decoding, upscale and remove artifacts from decoded video using an SR/VR model. In some example implementations that use an H.264/AVC encoder and decoder, when a scenario-specific SR/VR model is used for post-processing, the bitrate of encoded data for video can be reduced by up to 50% without an appreciable decrease in video quality.

Or, as another example, a conferencing tool can request video at a default spatial resolution (and hence typical bitrate) then, after decoding, remove artifacts from decoded video using a VR model. In particular, using a post-processing model can mitigate compression artifacts introduced during encoding by reducing their severity or even eliminating them. In this way, without increasing network bandwidth consumed, video quality can be improved.

By applying a post-processing model trained for a specific scenario, a conferencing tool can enhance quality by addressing artifacts introduced during compression and/or upscaling of video for that type of scenario. The extent of improvement (in terms of bitrate reduction or quality improvement) can depend on the scenario in a conferencing tool. In any case, by training different post-processing models for different scenarios, performance is enhanced.

In some examples, a conferencing tool applies a post-processing model to only the foreground segments of decoded video, not other segments of the decoded video. In this way, the conferencing tool can enhance quality of the foreground segments while avoiding the computational overhead of applying the post-processing model to other segments of the decoded video, where quality improvements would not be as noticeable.

In some examples, a conferencing tool selectively applies a post-processing model when video quality is low (e.g., due to low available network bandwidth) and hence susceptible to improvement with the post-processing model. In this way, the conferencing tool can enhance quality when most needed and effective, while avoiding the computational overhead of applying the post-processing model to decoded video that already has high quality.

In some example implementations, a post-processing model is used to improve video quality for a given bitrate or, alternatively, to reduce bitrate for a given level of video quality. In doing so, the post-processing model can add computational complexity and increase memory usage, and the post-processing model can also add latency due to processing delays. In many cases, however, the post-processing model can be implemented primarily using special-purpose hardware such as a neural processing unit. In any case, the added computational complexity, increased memory usage, and added latency are manageable and reasonable in exchange for improved video quality and/or reduced bitrate.

In some example implementations, a post-processing model is trained for post-processing of decoded video that has been encoded and decoded according to a specific codec standard or format. Moreover, the post-processing model may be trained for post-processing of decoded video that has been encoded at a particular target quality, bitrate, or spatial resolution. The post-processing model is trained using representative training data. To the extent the post-processing model is used for post-processing of decoded video that deviates significantly from the training data or training settings, performance of the post-processing model may suffer, even if some improvements in video quality and/or bitrate reduction are still achieved.

In some example implementations, post-processing of decoded video using a post-processing model uses special-purpose hardware at a client computing device to implement the post-processing model. For example, the special-purpose hardware can use a graphics processing unit or neural processing unit. With the special-purpose hardware, the client computing device can perform post-processing operations for runtime inference with the post-processing model without significant delay, such that significant latency is not introduced and such that the output frame rate is not adversely affected.

VIII. Example Computer Systems.

Figure 7:
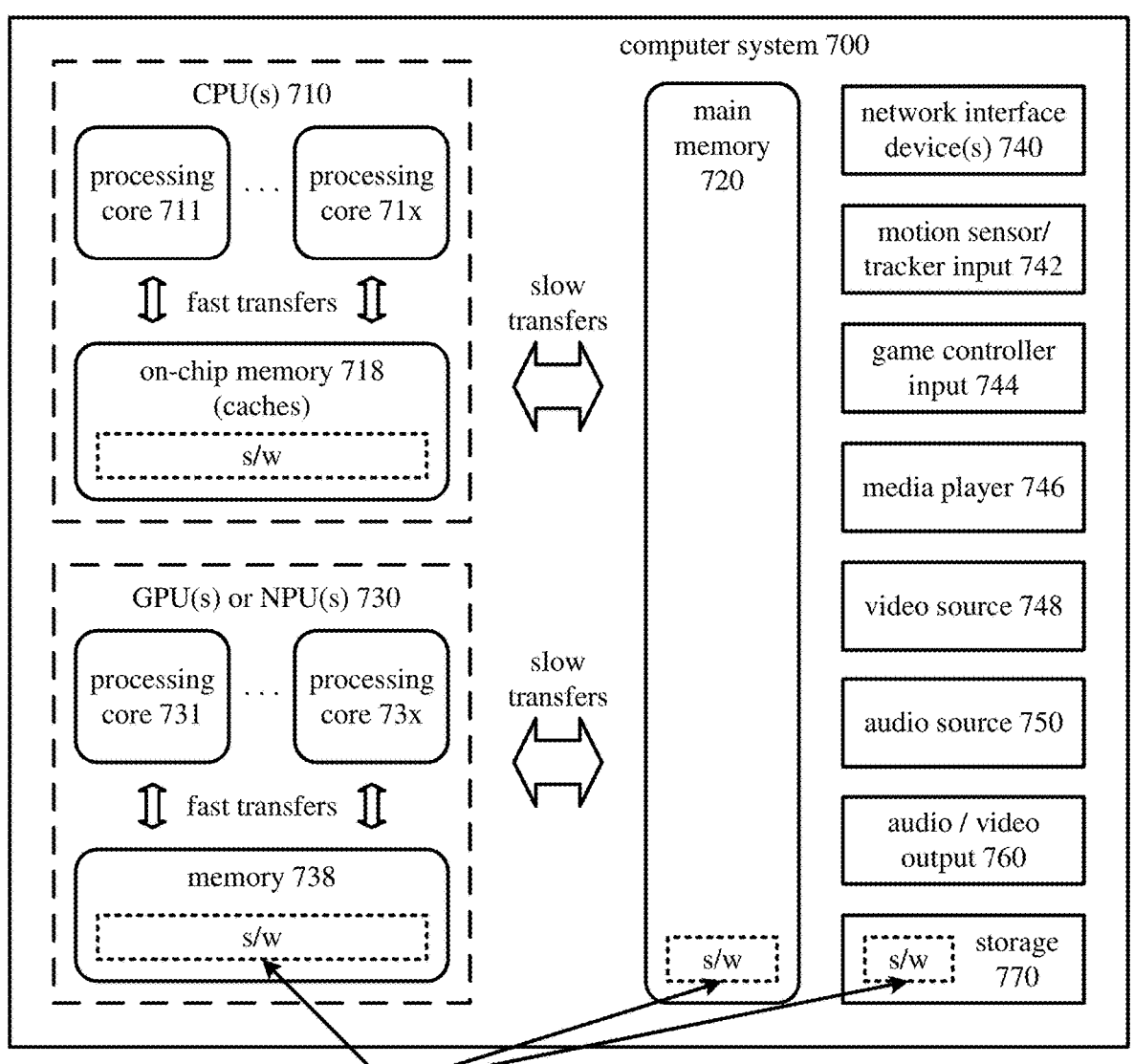
FIG. 7 is a diagram illustrating an example computer system in which some described embodiments can be implemented.

FIG. 7 illustrates a generalized example of a suitable computer system (700) in which several of the described innovations may be implemented. The innovations described herein relate to use of ML models for adaptive post-processing in video conferencing tools. The computer system (700) is not intended to suggest any limitation as to scope of use or functionality, as the innovations may be implemented in diverse computer systems, including special-purpose computer systems.

With reference to FIG. 7, the computer system (700) includes one or more processing cores (711 . . . 71x) and local memory (718) of a central processing unit ("CPU") (710) or multiple CPUs. The processing core(s) (711 . . . 71x) are, for example, processing cores on a single chip, and execute computer-executable instructions. The number of processing core(s) (711 . . . 71x) depends on implementation and can be, for example, 4 or 8. The local memory (718) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (711 . . . 71x). Alternatively, the processing cores (711 . . . 71x) can be part of a system-on-a-chip ("SoC"), application-specific integrated circuit ("ASIC"), or other integrated circuit.

The local memory (718) can store software (780) implementing aspects of the innovations for use of ML models for adaptive post-processing in video conferencing tools, for operations performed by the respective processing core(s) (711 . . . 71x), in the form of computer-executable instructions. In FIG. 7, the local memory (718) is on-chip memory such as one or more caches, for which access operations, transfer operations, etc. with the processing core(s) (711 . . . 71x) are fast.

The computer system (700) also includes processing cores (731 . . . 73x) and local memory (738) of a graphics processing unit ("GPU") or neural processing unit ("NPU") (730), or multiple GPUs or NPUs. The number of processing cores (731 . . . 73x) of the GPU or NPU depends on implementation. For a GPU, the processing cores (731 . . . 73x) are, for example, part of single-instruction, multiple data ("SIMD") units of the GPU. The SIMD width n, which depends on implementation, indicates the number of elements (sometimes called lanes) of a SIMD unit. For an NPU, the processing cores (731 . . . 73x) include, for example, specialized ML hardware blocks for operations such as matrix multiplication and convolution. The memory (738) may be volatile memory (e.g., registers, cache, RAM), non-volatile memory (e.g., ROM, EEPROM, flash memory), or some combination of the two, accessible by the respective processing cores (731 . . . 73x). The memory (738) can store software (780) implementing aspects of the innovations for use of ML models for adaptive post-processing in video conferencing tools, for operations performed by the respective processing cores (731 . . . 73x), in the form of computer-executable instructions such as shader code (for a GPU) or specialized code for ML hardware blocks (for an NPU).

The computer system (700) includes main memory (720), which may be volatile memory (e.g., RAM), non-volatile memory (e.g., ROM, EEPROM, flash memory), or some combination of the two, accessible by the processing core(s) (711 . . . 71x, 731 . . . 73x). The main memory (720) stores software (780) implementing aspects of the innovations for use of ML models for adaptive post-processing in video conferencing tools, in the form of computer-executable instructions. In FIG. 7, the main memory (720) is off-chip memory, for which access operations, transfer operations, etc. with the processing cores (711 . . . 71x, 731 . . . 73x) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, GPU, or NPU. A processor may also be a specific-purpose processor implemented using, for example, an ASIC or a field-programmable gate array ("FPGA"). A "processor system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU, other graphics hardware, or an NPU), or by special-purpose hardware (e.g., in an ASIC).

The computer system (700) includes one or more network interface devices (740). The network interface device(s) (740) enable communication over a network to another computing entity (e.g., server, other computer system). The network interface device(s) (740) can support wired connections and/or wireless connections, for a wide-area network, local-area network, personal-area network, or other network. For example, the network interface device(s) can include one or more Wi-Fi® transceivers, an Ethernet® port, a cellular transceiver and/or another type of network interface device, along with associated drivers, software, etc. The network interface device(s) (740) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (700) optionally includes a motion sensor/tracker input (742) for a motion sensor/tracker, which can track the movements of a user and objects around the user. For example, the motion sensor/tracker allows a user (e.g., player of a game) to interact with the computer system (700) through a natural user interface using gestures and spoken commands. The motion sensor/tracker can incorporate gesture recognition, facial recognition and/or voice recognition.

The computer system (700) optionally includes a game controller input (744), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (700) optionally includes a media player (746) and video source (748). The media player (746) can play DVDs, Blu-Ray™ discs, other disc media and/or other formats of media. The video source (748) can be a camera input that accepts video input in analog or digital form from a video camera, which captures natural video. Alternatively, the video source (748) can be a screen capture module (e.g., a driver of an operating system, or software that interfaces with an operating system) that provides screen capture content as input. Or, as another alternative, the video source (748) can be a graphics engine that provides texture data for graphics in a computer-represented environment. Or, as another alternative, the video source (748) can be a video card, TV tuner card, or other video input that accepts input video in analog or digital form (e.g., from a cable input, High-Definition Multimedia Interface ("HDMI") input or other input).

An optional audio source (750) accepts audio input in analog or digital form from a microphone, which captures audio, or other audio input.

The computer system (700) optionally includes a video output (760), which provides video output to a display device. The video output (760) can be an HDMI output or other type of output. An optional audio output (760) provides audio output to one or more speakers.

The storage (770) may be removable or non-removable, and includes magnetic media (such as magnetic disks, magnetic tapes or cassettes), optical disk media and/or any other media which can be used to store information, and which can be accessed within the computer system (700). The storage (770) stores instructions for the software (780) implementing aspects of the innovations for use of ML models for adaptive post-processing in video conferencing tools.

The computer system (700) may have additional features. For example, the computer system (700) includes one or more other input devices and/or one or more other output devices. The other input device(s) may be a touch input device such as a keyboard, mouse, pen, or trackball, a scanning device, or another device that provides input to the computer system (700). The other output device(s) may be a printer, CD-writer, or another device that provides output from the computer system (700).

An interconnection mechanism (not shown) such as a bus, controller, or network interconnects the components of the computer system (700). Typically, operating system software (not shown) provides an operating environment for other software executing in the computer system (700), and coordinates activities of the components of the computer system (700).

The computer system (700) of FIG. 7 is a physical computer system. A virtual machine can include components organized as shown in FIG. 7.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU, NPU, or special-purpose hardware to provide functionality described herein, instructions executable on processing cores of a GPU or NPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and a computer system can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and a computer system can include any combination of special-purpose hardware and/or hardware with software implementing the functionality described herein.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and they may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

As used herein, the term "based on" or "based at least in part on" indicates a dependence. A value or output X that is "based on" (or "based at least in part on") a value or input Y depends on Y but can also depend on additional information or factors. Y can be directly or indirectly used when determining, assigning, generating, calculating, or creating X "based on" (or "based at least in part on") Y. Thus, for example, the language determining or assigning X "based on" Y can indicate determining or assigning X using Y.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and these terms should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A client computing device comprising a processor system and memory, wherein the client computing device implements a conferencing tool configured to perform operations comprising:

receiving encoded data in a bitstream for a current unit of a video sequence;

decoding the encoded data, thereby producing decoded video for the current unit of the video sequence;

based on results of detecting a scenario with a scenario detection model, selecting between multiple trained post-processing models, wherein the scenario detection model is a machine learning model configured to produce, as output, an indication of the detected scenario, and wherein the indication of the detected scenario, as an identifier of the selected, trained post-processing model or as other indicia of the detected scenario, specifies a type of conferencing scenario selected from among multiple types of conferencing scenarios; and applying the selected, trained post-processing model to at least some of decoded video for the video sequence.

2. The client computing device of claim 1, wherein the operations further comprise:

with the scenario detection model, detecting the scenario in the decoded video for the current unit of the video sequence, thereby producing the results of the detecting the scenario with the scenario detection model.

3. The client computing device of claim 1, wherein the operations further comprise:

receiving, from a server computing device, the results of the detecting the scenario with the scenario detection model.

4. The client computing device of claim 1, wherein the scenario detection model uses a face detection model and a count of faces in the decoded video.

5. The client computing device of claim 1, wherein the machine learning model is configured to accept, as input, sample values of the decoded video for the current unit of the video sequence.

6. The client computing device of claim 5, wherein the scenario detection model is further configured to accept, as input, metadata from the bitstream that indicates one or more content characteristics of the current unit of the video sequence.

7. The client computing device of claim 1, wherein each of the multiple trained post-processing models is a super-resolution/video restoration model configured to increase spatial resolution, mitigate compression artifacts, and mitigate upsampling artifacts, and wherein spatial resolution increases between input to and output from the selected, trained post-processing model.

8. The client computing device of claim 1, wherein each of the multiple trained post-processing models is a video restoration model configured to mitigate compression artifacts, and wherein spatial resolution is unchanged between input to and output from the selected, trained post-processing model.

9. The client computing device of claim 1, wherein each of the multiple trained post-processing models has been trained to perform post-processing operations for a different type of conferencing scenario selected from among the multiple types of conferencing scenarios, and wherein the multiple types of conferencing scenarios include talking head video, conference room video, slideshow presentation video, and screen capture content video.

10. The client computing device of claim 1, wherein each of the multiple trained post-processing models is a given type of machine learning model, and wherein:

the given type of machine learning is the same for all of the multiple trained post-processing models; or the given type of machine learning is different for at least some of the multiple trained post-processing models.

11. The client computing device of claim 1, wherein the operations further comprise, for each of multiple subsequent units of the video sequence:

receiving encoded data in the bitstream for the subsequent unit of the video sequence;

decoding the encoded data for the subsequent unit, thereby producing decoded video for the subsequent unit of the video sequence;

determining whether or not to perform scenario evaluation; and responsive to a decision not to perform scenario evalua-
tion, applying the previously selected, trained post-
processing model to at least some of the decoded video
for the subsequent unit of the video sequence; or
otherwise, responsive to a decision to perform scenario
evaluation:
    with the scenario detection model, detecting a scenario
in the decoded video for the subsequent unit of the
video sequence;
    based on the detected scenario in the decoded video for
the subsequent unit of the video sequence, selecting
between the multiple trained post-processing mod-
els; and
    applying the newly selected, trained post-processing
model to at least some of decoded video for the video
sequence.

12. The client computing device of claim 11, wherein
scenario evaluation is:
    performed for every frame of the video sequence; or
    performed for every new scene of the video sequence.

13. The client computing device of claim 1, wherein the
current unit of the video sequence is a slice or frame.

14. The client computing device of claim 1, wherein the
operations further comprise, as part of bitrate negotiation
before or during conferencing:
    receiving one or more indicators of resources of the client
computing device, the resources including a default
spatial resolution, available network bandwidth, and/or
available processing resources for post-processing;
    determining one or more target characteristics of video
based at least in part on the one or more indicators; and
    requesting, for at least some of the video sequence,
encoded data for video having the one or more target
characteristics.

15. The client computing device of claim 14, wherein the
determining the one or more target characteristics includes,
based on the available network bandwidth being below a
bandwidth threshold and/or the available processing
resources for post-processing being above a processing
resources threshold:
    determining a target spatial resolution lower than the
default spatial resolution; or
    determining a target quality lower than a default quality.

16. The client computing device of claim 1, wherein the
operations further comprise:
    rendering video for display, the rendered video including
results of the applying the selected, trained post-pro-
cessing model to the at least some of the decoded video
for the video sequence.

17. The client computing device of claim 1, wherein the
operations further comprise:
    performing video quality analysis; and
    based at least in part on results of the video quality
analysis:

adjusting one or more target characteristics of video; or
    determining whether or not to perform post-processing.

18. The client computing device of claim 1, wherein the
operations further comprise:
    determining segmentation information for the decoded
video for the current unit of the video sequence, the
segmentation information indicating one or more fore-
ground segments of the decoded video for the current
unit of the video sequence, wherein the selected,
trained post-processing model is applied to the one or
more foreground segments of the decoded video for the
current unit of the video sequence but not applied to
one or more other segments of the decoded video for
the current unit of the video sequence.

19. In a client computing device that implements a
conferencing tool, a method comprising:
    receiving encoded data in a bitstream for a current unit of
a video sequence;
    decoding the encoded data, thereby producing decoded
video for the current unit of the video sequence;
    based on results of detecting a scenario with a scenario
detection model, selecting between multiple trained
post-processing models, wherein the scenario detection
model is a machine learning model configured to
produce, as output, an indication of the detected sce-
nario, and wherein the indication of the detected sce-
nario, as an identifier of the selected, trained post-
processing model or as other indicia of the detected
scenario, specifies a type of conferencing scenario
selected from among multiple types of conferencing
scenarios; and
    applying the selected, trained post-processing model to at
least some of decoded video for the video sequence.

20. One or more computer-readable media having stored
therein computer-executable instructions for causing a pro-
cessor system, when programmed thereby, to perform opera-
tions comprising:
    receiving encoded data in a bitstream for a current unit of
a video sequence;
    decoding the encoded data, thereby producing decoded
video for the current unit of the video sequence;
    based on results of detecting a scenario with a scenario
detection model, selecting between multiple trained
post-processing models, wherein the scenario detection
model is a machine learning model configured to
produce, as output, an indication of the detected sce-
nario, and wherein the indication of the detected sce-
nario, as an identifier of the selected, trained post-
processing model or as other indicia of the detected
scenario, specifies a type of conferencing scenario
selected from among multiple types of conferencing
scenarios; and
    applying the selected, trained post-processing model to at
least some of decoded video for the video sequence.

* * * * *